US010833557B2

(12) United States Patent
Severson

(10) Patent No.: US 10,833,557 B2
(45) Date of Patent: Nov. 10, 2020

(54) DUAL PURPOSE NO VOLTAGE WINDING DESIGN FOR BEARINGLESS AC HOMOPOLAR AND CONSEQUENT POLE MOTORS AND AN AC HOMOPOLAR FLYWHEEL ENERGY STORAGE SYSTEM

(71) Applicant: Regents of the University of Minnesota, Minneapolis, MN (US)

(72) Inventor: Eric Severson, Middleton, WI (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 21 days.

(21) Appl. No.: 15/669,594

(22) Filed: Aug. 4, 2017

(65) Prior Publication Data

US 2018/0183298 A1 Jun. 28, 2018

Related U.S. Application Data

(63) Continuation of application No. PCT/US2016/016910, filed on Feb. 6, 2016.
(Continued)

(51) Int. Cl.
*H02K 7/02* (2006.01)
*F16C 32/04* (2006.01)
(Continued)

(52) U.S. Cl.
CPC .......... *H02K 7/025* (2013.01); *F16C 32/0497* (2013.01); *H02K 3/28* (2013.01);
(Continued)

(58) Field of Classification Search
CPC ...... F16C 32/00; F16C 32/04; F16C 32/0454; F16C 32/0459; F16C 32/0465;
(Continued)

(56) References Cited

U.S. PATENT DOCUMENTS 3,877,761 A 4/1975 Padana
4,732,353 A 3/1988 Studer
(Continued)

FOREIGN PATENT DOCUMENTS

CN 103259464 A 8/2013
CN 105391214 3/2016
(Continued)

OTHER PUBLICATIONS

K. Sivasubramaniam, et al "Development of a High Speed Generator for Airborne Applications," IEEE Transactions on Applied Superconductivity, vol. 19, No. 3, Jun. 2009.
(Continued)

*Primary Examiner* — Tran N Nguyen
(74) *Attorney, Agent, or Firm* — Steven M. Koehler; Westman, Champlin & Koehler, P.A.

(57) ABSTRACT

A motor includes a rotor used in conjunction with a stator to produce a magnetic field in the air gap having p pole pairs, wherein a single cross section of the rotor taken orthogonal to an axis of rotation comprises iron having a structure forming p teeth. The stator has at least one stator winding configured to form p pole pairs to produce a first magnetic field to rotate the rotor about the axis of rotation and configured to produce a second magnetic field of either one pole pair or p±1 pole pairs to create forces radial to the axis of rotation. The at least one stator winding has two sets of terminals, a first set of terminals for carrying current that produces the first magnetic field in the air gap having p pole pairs to rotate the rotor about the axis of rotation and a second set of terminals for carrying current that produces the second magnetic field in the air gap having either one pole pair or p±1 pole pairs to create the forces radial to the axis of rotation. The second set of terminals experience no
(Continued)

motional-electromotive force when the rotor is centered on the axis of rotation.

24 Claims, 17 Drawing Sheets

Related U.S. Application Data

(60) Provisional application No. 62/113,090, filed on Feb. 6, 2015.

(51) Int. Cl.
| | |
|---|---|
| *H02K 7/09* | (2006.01) |
| *H02K 19/20* | (2006.01) |
| *H02P 25/22* | (2006.01) |
| *H02K 19/10* | (2006.01) |
| *H02K 3/28* | (2006.01) |
| *H02P 25/18* | (2006.01) |
| *H02K 11/33* | (2016.01) |
| *H02K 31/02* | (2006.01) |

(52) U.S. Cl.
CPC .............. *H02K 7/09* (2013.01); *H02K 11/33* (2016.01); *H02K 19/103* (2013.01); *H02K 19/20* (2013.01); *H02K 31/02* (2013.01); *H02P 25/18* (2013.01); *H02P 25/22* (2013.01); *F16C 2380/28* (2013.01); *Y02E 60/16* (2013.01)

(58) Field of Classification Search
CPC ... F16C 32/0493; F16C 32/0497; H02K 7/00; H02K 7/02; H02K 7/025; H02K 7/09; H02K 7/18; H02K 11/00; H02K 11/33; H02K 19/00; H02K 19/20; H02K 19/103; H02K 3/00; H02K 3/28; H02P 25/00; H02P 25/18; H02P 25/22; G11B 19/00; G11B 19/20; G11B 19/2009

See application file for complete search history.

(56) References Cited

U.S. PATENT DOCUMENTS

| | | | |
|---|---|---|---|
| 4,791,710 A | 12/1988 | Nocek et al. | |
| 4,792,710 A | 12/1988 | Williamson | |
| 5,084,644 A | 1/1992 | Harris et al. | |
| 5,237,229 A | 8/1993 | Ohishi | |
| 5,424,595 A | 6/1995 | Preston et al. | |
| 5,682,073 A * | 10/1997 | Mizuno | H02K 21/046 310/156.25 |
| 5,763,972 A | 6/1998 | Bernus et al. | |
| 5,880,550 A | 3/1999 | Fukao | |
| 5,936,370 A | 8/1999 | Fukao et al. | |
| 5,949,162 A | 9/1999 | Mishkevich et al. | |
| 5,955,811 A | 9/1999 | Chiba | |
| 6,020,665 A | 2/2000 | Maurio et al. | |
| 6,034,456 A | 3/2000 | Osama et al. | |
| 6,049,148 A | 4/2000 | Nichols et al. | |
| 6,078,119 A | 6/2000 | Satoh et al. | |
| 6,130,494 A | 10/2000 | Schob | |
| 6,559,567 B2 | 5/2003 | Schob | |
| 7,250,734 B1 | 7/2007 | Iannello et al. | |
| 8,330,311 B2 | 12/2012 | Ramsey et al. | |
| 8,917,004 B2 | 12/2014 | Kalev | |
| 8,987,959 B2 | 3/2015 | Sortore et al. | |
| 2003/0057784 A1* | 3/2003 | Kanebako | F16C 32/0459 310/90.5 |
| 2005/0077793 A1 | 4/2005 | Garvey | |
| 2006/0012329 A1 | 1/2006 | Aoki et al. | |
| 2008/0246348 A1 | 10/2008 | Angelis et al. | |
| 2009/0149999 A1 | 6/2009 | Schramm | |
| 2009/0261678 A1 | 10/2009 | Sortore | |
| 2010/0231076 A1* | 9/2010 | Chiba | F16C 32/0459 310/90.5 |
| 2010/0327687 A1 | 12/2010 | Iannello | |
| 2012/0068558 A1* | 3/2012 | Ahn | H02K 7/09 310/46 |
| 2014/0084714 A1 | 3/2014 | Kalev | |
| 2014/0084756 A1 | 3/2014 | Kalev | |
| 2015/0097459 A1 | 4/2015 | Kalev | |

FOREIGN PATENT DOCUMENTS

| | | | |
|---|---|---|---|
| EP | 2761726 A | 8/2014 | |
| EP | 3211787 A1 | 8/2017 | |
| JP | 2005110387 | * 4/2005 | ............... H02K 7/09 |
| WO | 2016127147 | 8/2016 | |
| WO | 2016207481 | 12/2016 | |

OTHER PUBLICATIONS

K. Sivasubramaniam, et al "High-Temperature Superconducting Homopolar Inductor Alternator for Marine Applications," IEEE Transactions on Applied Superconductivity, vol. 18, No. 1, Mar. 2008.
B.J. Kirby, Frequency regulation basics and trends, United States. Department of Energy, 2005.
J.P. Barton and D.G. Infield, "Energy storage and its use with intermittent renewable energy," Energy Conversion, IEEE Transactions on, vol. 19, No. 2, pp. 441-448 2004.
A. Oudalov, T. Buehler and D. Chartouni, "Utility scale applications of energy storage," in Energy 2030 Conference, 2008. Energy 2008. IEEE, 2008, pp. 1-7.
H. Ibrahim, A. Ilinca and J. Perron, "Energy storage systems—characteristics and comparisons," Renewable and Sustainable Energy Reviews, vol. 12, No. 5, pp. 1221-1250 2008.
P. Denholm, E. Ela, B. Kirby and M. Milligan, "The role of energy storage with renewable electricity generation," 2010.
C.S. Hearn, M.C. Lewis, S.B. Pratap, R.E. Hebner, F.M. Uriarte, Dongmei Chen and R.G. Longoria, "Utilization of optimal control law to size grid-level flywheel energy storage," Sustainable Energy, IEEE Transactions on, vol. 4, No. 3, pp. 611-618 2013.
C.S. Hearn, "Design methodologies for advanced flywheel energy storage," Ph.D. dissertation, The University of Texas at Austin, 2013.
S. Tewari and N. Mohan, "Value of NAS energy storage toward integrating wind: Results from the wind to battery project," 2013.
Hearn, C. S., Flynn, M. M., Lewis, M. C., Thompson, R. C., Longoria, R. G., "Low Cost Flywheel Energy Storage for a Fuel Cell Powered Transit Bus," Proceedings of the IEEE Vehicular Power and Propulsion Conference, Sep. 9-12, 2007.
Hayes, R. J., Weeks, D. A., Flynn, M. M., Beno, J. H., Guenin, A. M., Zierer, J. J. and Stifflemire, T., "Design and Performance Testing of an Advanced Integrated Power System with Flywheel Energy Storage," in the SAE International Proceedings of the Future Transportation Technology Conference, Costa Mesa, CA, Jun. 23-25, 2003.
Hawkins, L. A. Flynn, M., "Influence of Control Strategy on Measured Actuator Power Consumption in an Energy Storage Flywheel with Magnetic Bearings," in the Proceedings of the 6th International Symposium on Magnetic Suspension Technology, Turin, Italy, 2001.
M.M. Flynn, P. McMullen and O. Solis, "Saving energy using flywheels," Industry Applications Magazine, IEEE, vol. 14, No. 6, pp. 69-76 2008.
M.A. Pichot and M.D. Driga, "Loss reduction strategies in design of magnetic bearing actuators for vehicle applications," Magnetics, IEEE Transactions on, vol. 41, No. 1, pp. 492-496 2005.
M. Strasik, P.E. Johnson, A.C. Day, J. Mittleider, M.D. Higgins, J. Edwards, J.R. Schindler, K.E. McCrary, C.R. McIver, D. Carlson, J.F. Gonder and J.R. Hull, "Design, fabrication, and test of a 5-kWh/100-kW flywheel energy storage utilizing a high-temperature superconducting bearing," Applied Superconductivity, IEEE Transactions on, vol. 17, No. 2, pp. 2133-2137 2007.

(56) References Cited

OTHER PUBLICATIONS

E. Rodriguez and J. Santisteban, "An improved control system for a split winding bearingless induction motor," Industrial Electronics, IEEE Transactions on, vol. 58, No. 8, pp. 3401-3408, Aug. 2011.
H.F. Hofmann, "High-speed synchronous reluctance machine for flywheel applications," Ph.D. dissertation, The University of California at Berkley, 1998.
P. Tsao, M. Senesky and S.R. Sanders, "An integrated flywheel energy storage system with homopolar inductor motor/generator and high-frequency drive," Industry Applications, IEEE Transactions on, vol. 39, No. 6, pp. 1710-1725 2003.
T. Ichihara, K. Matsunaga, M. Kita, I. Hirabayashi, M. Isono, M. Hirose, K. Yoshii, K. Kurihara, O. Saito, S. Saito, M. Murakami, H. Takabayashi, M. Natsumeda and N. Koshizuka, "Application of superconducting magnetic bearings to a 10 kWh-class flywheel energy storage system," Applied Superconductivity, IEEE Transactions on, vol. 15, No. 2, pp. 2245-2248 2005.
F.N. Werfel, U. Floegel-Delor, T. Riedel, R. Rothfeld, D. Wippich, B. Goebel, G. Reiner and N. Wehlau, "A compact HTS 5 kWh/250 kW flywheel energy storage system," Applied Superconductivity, IEEE Transactions on, vol. 17, No. 2, pp. 2138-2141 2007.
M.M. Flynn, "A methodology for evaluating and reducing rotor losses, heating, and operational limitations of high-speed flywheel batteries," Ph.D. dissertation, The University of Texas at Austin, 2003. https://repositories.lib.utexas.edu/handle/2152/11987.
P. Kascak, R. Jansen, T. Dever, A. Nagorny and K. Loparo, "Bearingless Five-Axis Rotor Levitation with Two Pole Pair Separated Conical Motors," in Industry Applications Society Annual Meeting, 2009. IAS 2009. IEEE, 2009, pp. 1-9.
Qian Wang, Chengjun Liu, Jibin Zou, Xinghe Fu and Juan Zhang, "Numerical analysis and design optimization of a homopolar inductor machine used for flywheel energy storage," Plasma Science, IEEE Transactions on, vol. 41, No. 5, pp. 1290-1294 2013.
T.D. Nguyen and G. Foo, "Sensorless control of a dual-airgap axial flux permanent magnet machine for flywheel energy storage system," Electric Power Applications, IET, vol. 7, No. 2, pp. 140-149, 2013.
A. Chiba, T. Fukao, O. Ichikawa, M. Oshima, M. Takemoto and D.G. Dorrell, Magnetic bearings and bearingless drives, Access Online via Elsevier, 2005.
E. Severson, R. Nilssen, T. Undeland and N. Mohan, "Outer-rotor ac homopolar motors for flywheel energy storage," in the 7th IET International Conference on Power Electronics, Machines and Drives, 2014, p. 1-6.
E. Severson, R. Nilssen, T. Undeland and N. Mohan, "Analysis of the bearingless AC homopolar motor," in Electrical Machines (ICEM), 2012 XXth International Conference on, 2012, pp. 568-576.
K. Raggl, B. Warberger, T. Nussbaumer, S. Burger and J.W. Kolar, "Robust angle-sensorless control of a PMSM bearingless pump," Industrial Electronics, IEEE Transactions on, vol. 56, No. 6, pp. 2076-2085 2009.
M. Ooshima and C. Takeuchi, "Magnetic suspension performance of a bearingless brushless DC motor for small liquid pumps," Industry Applications, IEEE Transactions on, vol. 47, No. 1, pp. 72-78 2011.
A. Chiba, T. Fukao and M. Azizur Rahman, "Vibration suppression of a flexible shaft with a simplified bearingless induction motor drive," Industry Applications, IEEE Transactions on, vol. 44, No. 3, pp. 745-752 2008.
A. Laiho, A. Sinervo, J. Orivuori, K. Tammi, A. Arkkio and Kai Zenger, "Attenuation of harmonic rotor vibration in a cage rotor induction machine by a self-bearing force actuator," Magnetics, IEEE Transactions on, vol. 45, No. 12, pp. 5388-5398 2009.
A. Chiba, K. Sotome, Y. Iiyama and M. Azizur Rahman, "A novel middle-point-current-injection-type bearingless PM synchronous motor for vibration suppression," Industry Applications, IEEE Transactions on, vol. 47, No. 4, pp. 1700-1706 2011.

Xinghe Fu, Mingyao Lin, Haitao Yu, Li Hao, Da Xu, Ping Jin and Jibin Zou, "Calculation and analysis of iron loss in homopolar inductor alternator," Magnetics, IEEE Transactions on, vol. 48, No. 11, pp. 3466-3469 2012.
Zhang-ao Ren, Kexun Yu, Zhenxiu Lou and Caiyong Ye, "Investigation of a novel pulse CCPS utilizing inertial energy storage of homopolar inductor alternator," Plasma Science, IEEE Transactions on, vol. 39, No. 1, pp. 310-315 2011.
S.S. Kalsi, Applications of high temperature superconductors to electric power equipment, John Wiley & Sons, 2011.
N. Levin, S. Orlova, V. Pugachov and L. Ribickis, "Optimization of the magnetic circuit of the homopolar inductor machine with non-overlapping concentrated windings," in Power Electronics and Motion Control Conference (EPE/PEMC), 2010 14th International, 2010, pp. T4-77-T4-81.
K. Sivasubramaniam, T. Zhang, M. Lokhandwalla, E.T. Laskaris, J.W. Bray, B. Gerstler, M.R. Shah and J.P. Alexander, "Development of a high speed HTS generator for airborne applications," Applied Superconductivity, IEEE Transactions on, vol. 19, No. 3, pp. 1656-1661 2009.
O. Ichikawa, A. Chiba and T. Fukao, "Inherently decoupled magnetic suspension in homopolar-type bearingless motors," Industry Applications, IEEE Transactions on, vol. 37, No. 6, pp. 1668-1674, 2001.
J. Asama, R. Natsume, H. Fukuhara, T. Oiwa and A. Chiba, "Optimal suspension winding configuration in a homo-polar bearingless motor," Magnetics, IEEE Transactions on, vol. 48, No. 11, pp. 2973-2976 2012.
H. Kanebako and Y. Okada, "New design of hybrid-type self-bearing motor for small, high-speed spindle," Mechatronics, IEEE/ASME Transactions on, vol. 8, No. 1, pp. 111-119 2003.
T. Schneeberger, T. Nussbaumer and J.W. Kolar, "Magnetically levitated homopolar hollow-shaft motor," Mechatronics, IEEE/ASME Transactions on, vol. 15, No. 1, pp. 97-107 2010.
J. Asama, D. Kanehara, T. Oiwa and A. Chiba, "Suspension performance of a two-axis actively regulated consequent-pole bearingless motor," Energy Conversion, IEEE Transactions on, vol. PP, No. 99, pp. 1-8 2013.
E. Severson, A. Rokke, R. Nilssen, T. Undeland and N. Mohan, "Design and measurement of a passive thrust magnetic bearing for a bearingless motor," in IECON 2013—39th Annual Conference on IEEE Industrial Electronics Society, 2013.
E. Severson, R. Nilssen, T. Undeland and N. Mohan, "Suspension Force Model for Bearingless AC Homopolar Machines Designed for Flywheel Energy Storage," in GCC Conference and Exhibition (GCC), 2013 IEEE, 2013.
S.W.K. Khoo, R.L. Fittro and S.D. Garvey, "An AC self-bearing rotating machine with a single set of windings," in Power Electronics, Machines and Drives, 2002. International Conference on (Conf. Publ. No. 487), 2002, pp. 292-297.
R. Oishi, S. Horima, H. Sugimoto and A. Chiba, "A novel parallel motor winding structure for bearingless motors," Magnetics, IEEE Transactions on, vol. 49, No. 5, pp. 2287-2290 2013.
Hongwei Gao, F.R. Salmasi and M. Ehsani, "Inductance model-based sensorless control of the switched reluctance motor drive at low speed," Power Electronics, IEEE Transactions on, vol. 19, No. 6, pp. 1568-1573 2004.
F. Genduso, R. Miceli, C. Rando and G.R. Galluzzo, "Back EMF sensorless-control algorithm for high-dynamic performance PMSM," Industrial Electronics, IEEE Transactions on, vol. 57, No. 6, pp. 2092-2100 2010.
A. Chiba and J.A. Santisteban, "A PWM harmonics elimination method in simultaneous estimation of magnetic field and displacements in bearingless induction motors," Industry Applications, IEEE Transactions on, vol. 48, No. 1, pp. 124-131 2012.
P. Tsao, S.R. Sanders and G. Risk, "A self-sensing homopolar magnetic bearing: analysis and experimental results," in Industry Applications Conference, 1999. Thirty-Fourth IAS Annual Meeting. Conference Record of the 1999 IEEE, 1999, pp. 2560-2565 vol. 4.
Jung-Sik Yim, Jang-Hwan Kim, Seung-Ki Sul, Hyeong-Joon Ahn and Dong-Chul Han, "Sensorless position control of active magnetic bearings based on high frequency signal injection method," in

(56) References Cited

OTHER PUBLICATIONS

Applied Power Electronics Conference and Exposition, 2003. APEC '03. Eighteenth Annual IEEE, 2003, pp. 83-88 vol. 1.

N.L. Brown, L. Haydock, E. Spooner, A. Mebarki and A. Novinschi, "Equivalent circuit modeling of new brushless synchronous alternator," Electric Power Applications, IEE Proceedings-, vol. 152, No. 4, pp. 812-820 2005.

E. Severson, R. Nilssen, T. Undeland, N. Mohan, "Analysis of the bearingless AC homopolar motor," Electrical Machines (ICEM), 2012 XXth International Conference on, pp. 570-575, Sep. 2-5, 2012.

W. K. S. Khoo, K. Kalita, and S. Garvey, "Practical implementation of the bridge configured winding for producing controllable transverse forces in electrical machines," Magnetics, IEEE Transactions on, vol. 47, No. 6, pp. 1712-1718, 2011.

E. Severson, A. Rokke, R. Nilssen, T. Undeland, N. Mohan, "Design and measurement of a passive thrust magnetic bearing for a bearingless motor," IECON 2013—39th Annual Conference on IEEE Industrial Electronics Society, Nov. 10-13, 2013.

T. Takenaga, Y. Kubota, A. Chiba, and T. Fukao, "A principle and winding design of consequent-pole bearingless motors," JSME International Journal Series C, vol. 46, No. 2, pp. 363-369, 2003.

S. Tewari, C. J. Geyer, N. Mohan, "A Statistical Model for Wind Power Forecast Error and its Application to the Estimation of Penalties in Liberalized Markets," Power Systems, IEEE Transactions on, vol. 26, No. 4, pp. 2031-2039, Nov. 2011.

Flynn, M. M., McMullen, P., Solis, O., "Saving Energy Using Flywheels," IEEE Industry Applications Magazine, vol. 14, No. 6, pp. 69-76, Nov./Dec. 2008.

Flynn, M. M., Hearn, C. S., Lewis, M. C., Thompson, R. C., Longoria, R. G., "Prime Mover and Energy Storage Considerations for a Hydrogen-Powered Series Hybrid Shuttle Bus," Proceedings of the IEEE Vehicular Power and Propulsion Conference, Sep. 9-12, 2007.

Flynn, M. M., Zierer, J. J., Thompson, R. C., "Performance Testing of a Vehicular Flywheel Energy System," SAE 2005 Transactions Journal of Passenger Cars—Mechanical Systems, vol. 114, pp. 119-126, Feb. 2006.

Flynn, M. M., Paylan, A., "A Novel High-Speed Flywheel Based DC Voltage Source with Soft Handover Capability," Proceedings of the IEEE International Electric Machines and Drives Conference, San Antonio, TX, May 15-18, 2005.

"Overview of bearingless induction motors," Mathematical Problems in Engineering, vol. 2014, 2014.

P. Kascak, R. Jansen, T. Dever, A. Nagorny, and K. Loparo, "Levitation performance of two opposed permanent magnet pole-pair separated conical bearingless motors," in Energy Conversion Congress and Exposition (ECCE), IEEE, 2011, pp. 1649-1656.

A. Chiba, T. Deido, T. Fukao, and M. Rahman, "An analysis of bearingless ac motors," Energy Conversion, IEEE Transactions on, vol. 9, No. 1, pp. 61-68, Mar. 1994.

Pyrhonen, T. Jokinen, and V. Hrabovcová, Design of rotating electrical machines. Wiley. com, 2009.

M. Lazarewicz and T. Ryan, "Integration of flywheel-based energy storage for frequency regulation in deregulated markets," in Power and Energy Society General Meeting, 2010 IEEE, 2010, pp. 1-6.

Huang, B. Li, H. Jiang, and M. Kang, "Analysis and control of multiphase permanent-magnet bearingless motor with a single set of half-coiled winding," Industrial Electronics, IEEE Transactions on, vol. 61, No. 7, pp. 3137-3145, Jul. 2014.

M. A. Pichot, J. Kajs, B. R. Murphy, A. Ouroua, B. Rech, R. Hayes, J. Beno, G. Buckner, and A. Palazzolo, "Active magnetic bearings for energy storage systems for combat vehicles," Magnetics, IEEE Transactions on, vol. 37, No. 1, pp. 318-323, 2001.

F. Werfel, U. Floegel-Delor, R. Rothfeld, T. Riedel, B. Goebel, D. Wippich, and P. Schirrmeister, "Superconductor bearings, flywheels and transportation," Superconductor Science and Technology, vol. 25, No. 1, p. 014007, 2012.

P. Acarnley, B. Mecrow, J. Burdess, J. N. Fawcett, P. Dickinson, and J. G. Kelly, "An integrated fly-wheel/machine energy store for road vehicles," in New Topologies for Permanent Magnet Machines (Digest No. 1997/090), IEE Colloquium on, 1997, pp. 9/1-9/6.

X. Sun, L. Chen, and Z. Yang, "Overview of bearingless permanent-magnet synchronous motors," Industrial Electronics, IEEE Transactions on, vol. 60, No. 12, pp. 5528-5538, Dec. 2013.

K. Raggl, T. Nussbaumer, and J. W. Kolar, "Comparison of separated and combined winding concepts for bearingless centrifugal pumps," J. Power Electron, vol. 9, No. 2, pp. 243-258, 2009.

T. Reichert, T. Nussbaumer, and J. Kolar, "Bearingless 300-w pmsm for bioreactor mixing," Industrial Electronics, IEEE Transactions on, vol. 59, No. 3, pp. 1376-1388, Mar. 2012.

W. Gruber, T. Nussbaumer, H. Grabner, and W. Amrhein, "Wide air gap and large-scale bearingless segment motor with six stator elements," Magnetics, IEEE Transactions on, vol. 46, No. 6, pp. 2438-2441, Jun. 2010.

D. Steinert, T. Nussbaumer, and J. Kolar, "Slotless bearingless disk drive for high-speed and high-purity applications," Industrial Electronics, IEEE Transactions on, vol. 61, No. 11, pp. 5974-5986, Nov. 2014.

Y. Okada, N. Yamashiro, K. Ohmori, T. Masuzawa, T. Yamane, Y. Konishi, and S. Ueno, "Mixed flow artificial heart pump with axial self-bearing motor," Mechatronics, IEEE/ASME Transactions on, vol. 10, No. 6, pp. 658-665, Dec. 2005.

K. Asami, A. Chiba, M. Azizur Rahman, T. Hoshino, and A. Nakajima, "Stiffness analysis of a magnetically suspended bearingless motor with permanent magnet passive positioning," Magnetics, IEEE Transactions on, vol. 41, No. 10, pp. 3820-3822, Oct. 2005.

H. Mitterhofer, W. Gruber, and W. Amrhein, "On the high speed capacity of bearingless drives," Industrial Electronics, IEEE Transactions on, vol. 61, No. 6, pp. 3119-3126, Jun. 2014.

T. Baumgartner, R. Burkart, and J. Kolar, "Analysis and design of a 300-w 500 000-r/min slotless self-bearing permanent-magnet motor," Industrial Electronics, IEEE Transactions on, vol. 61, No. 8, pp. 4326-4336, Aug. 2014.

T. Reichert, T. Nussbaumer, and J. Kolar, "Investigation of exterior rotor bearingless motor topologies for high-quality mixing applications," Industry Applications, IEEE Transactions on, vol. 48, No. 6, pp. 2206-2216, Nov. 2012.

W. Gruber, W. Amrhein, and M. Haslmayr, "Bearingless segment motor with five stator elements—design and optimization," Industry Applications, IEEE Transactions on, vol. 45, No. 4, pp. 1301-1308, Jul. 2009.

E. Severson, R. Nilssen, T. Undeland, and N. Mohan, "Dual purpose no voltage winding design for the bearingless ac homopolar and consequent pole motors," in Power Electronics Conference (IPEC), 2014 International, May 2014, pp. 58-62.

T. Reichert, J. Kolar, and T. Nussbaumer, "Stator tooth design study for bearingless exterior rotor pmsm," Industry Applications, IEEE Transactions on, vol. 49, No. 4, pp. 1515-1522, Jul. 2013.

R. L. A. Ribeiro, F. E. F. Castro, A. Salazar, and A. Maitelli, "A suitable current control strategy for split-phase bearingless three-phase induction machine," in Power Electronics Specialists Conference, 2005. PESC '05. IEEE 36th, Jun. 2005, pp. 701-706.

* cited by examiner

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Top | $v$ | $v$ | $-u$ | $-u$ | $w$ | $w$ | $u$ | $u$ | $-v$ | $-v$ | $0$ | $0$ | $w$ | $w$ | $u$ | $u$ | $0$ | $0$ | $-u$ | $-u$ | $w$ | $w$ | $u$ | $u$ | $-w$ |
| Mid | $v$ | $-u$ | $-u$ | $w$ | $w$ | $0$ | $0$ | $-v$ | $-v$ | $0$ | $0$ | $-u$ | $-u$ | $0$ | $0$ | $-w$ | $-w$ | $0$ | $0$ | $-u$ | $-u$ | $0$ | $0$ | $-w$ | $-w$ |
| Bot | $v_s$ | $v_s$ | $v_s$ | $v_s$ | $v_s$ | $v_s$ | $v_s$ | $v_s$ | $v_s$ | $v_s$ | $-u_s$ | $-u_s$ | $-u_s$ | $-u_s$ | $-u_s$ | $-u_s$ | $-u_s$ | $-u_s$ | $u_s$ | $u_s$ | $-w_s$ | $-w_s$ | $-w_s$ | $-w_s$ | $-w_s$ |

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Top | $v$ | $v$ | $-u$ | $-u$ | $w$ | $w$ | $u$ | $u$ | $-v$ | $-v$ | $0$ | $0$ | $w$ | $w$ | $u$ | $u$ | $0$ | $0$ | $-u$ | $-u$ | $w$ | $w$ | $u$ | $u$ | $-w$ |
| Mid | $v$ | $-u$ | $-u$ | $w$ | $w$ | $0$ | $0$ | $-v$ | $-v$ | $0$ | $0$ | $-u$ | $-u$ | $0$ | $0$ | $-w$ | $-w$ | $0$ | $0$ | $-u$ | $-u$ | $0$ | $0$ | $-w$ | $-w$ |

DUAL PURPOSE NO VOLTAGE WINDING DESIGN FOR BEARINGLESS AC HOMOPOLAR AND CONSEQUENT POLE MOTORS AND AN AC HOMOPOLAR FLYWHEEL ENERGY STORAGE SYSTEM

CROSS-REFERENCE TO RELATED APPLICATION

The present application is a national stage of and claims priority of International patent application Serial No. PCT/US16/16910, filed Feb. 6, 2016, which claims the benefit of provisional patent application Ser. No. 62/113,090 filed Feb. 6, 2015, the contents of which are incorporated herein in their entirety.

STATEMENT REGARDING FEDERALLY SPONSORED RESEARCH AND DEVELOPMENT

This invention was made with government support under N00014-13-1-0511 awarded by the Department of Defense/Navy. The government has certain rights in this invention.

BACKGROUND

The discussion below is merely provided for general background information and is not intended to be used as an aid in determining the scope of the claimed subject matter.

By definition, bearingless electric motors are machines which are able to use the same iron to function as both a motor and a magnetic bearing. These motors are attractive for applications in several industrial settings, including: high purity environments where the rotor must be isolated from the stator, such as pharmaceutical, chemical, and semiconductor mixing and pump applications; implantable biomedical devices, where the rotor is inaccessible; and high-speed and ultra-high-speed machines, such as flywheel energy storage, spindle-based milling tools, and laser scanning systems.

Conventional bearingless motors require two sets of stator windings: an armature winding for torque production and a suspension winding for magnetic bearing operation. Typically, the suspension winding and the torque winding share the same stator slots. The slot space allocated to the suspension winding must be large enough to achieve an acceptable current density for a worst-case (highest-possible) suspension current. In typical applications, this worse-case suspension current may only occur on rare occasions. Examples of such occasions include when the machine/motor is passing through a critical speed or during startup, when the rotor is highly eccentric. For these motors, the normal suspension current is small compared to the worst case scenario and therefore during typical operation the current density in the suspension winding is very low. This wastes valuable slot space that could otherwise be used for the torque winding, degrading the motor performance.

Recently, winding methods which use the same coils to produce both radial forces and torque have been developed. Such methods can improve motor performance as the entire slot space can be used to carry torque-producing current when no magnetic bearing forces are required or force-producing current during an emergency. In some individual slots the suspension coil current direction is opposite to the torque coil current direction. One group of these winding techniques can be differentiated by the fact that it provides separate suspension terminal connections which experience no motional-EMF (electromotive force) when the rotor is centered, so-called "dual purpose no voltage" (hereinafter "DPNV") windings.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention is a winding design is proposed for the bearingless ac homopolar and consequent pole motors that utilizes the same coils for both suspension force and torque production. The design provides a "pure" bearingless motor design, where the same iron and copper are used for both magnetic bearing operation and torque production, and can result in more optimal motor performance. Separate terminal connections are provided for suspension and torque operation; the suspension terminals experience no motional-emf when the rotor is centered, thereby reducing the required voltage rating of the bearingless drive compared to other dual purpose winding designs.

Another aspect of the invention is a motor design includes a rotor used in conjunction with a stator to produce a magnetic field in the air gap having p pole pairs, wherein a single cross section of the rotor taken orthogonal to an axis of rotation comprises iron having a structure forming p teeth. The stator has at least one stator winding configured to form p pole pairs to produce a first magnetic field to rotate the rotor about the axis of rotation and configured to produce a second magnetic field of either one pole pair or p±1 pole pairs to create forces radial to the axis of rotation. The at least one stator winding has two sets of terminals, a first set of terminals for carrying current that produces the first magnetic field in the air gap having p pole pairs to rotate the rotor about the axis of rotation and a second set of terminals for carrying current that produces the second magnetic field in the air gap having either one pole pair or p±1 pole pairs to create the forces radial to the axis of rotation. The second set of terminals experience no motional-electromotive force when the rotor is centered on the axis of rotation.

As used herein "motor" generally refers to operation so as to produce torque, irrespective of the direction of rotation, based on electrical power received from a power source as well as producing electrical power based on mechanical power received from a prime mover (i.e. when operated as a generator).

Practical implementations of the power electronics required to operate bearingless motors with so-called "dual purpose no voltage" (DPNV) windings are described. In particular, two-level inverters are described for the two configurations of DPNV windings: the "parallel" and "bridge" configurations. It should be noted though the power electronics or drives are not limited to bearingless DPNV motors but also can be used with any type of motor having DPNV windings. For instance, the power electronics can be used in a consequent pole motor or ac homopolar motor where mechanical bearings are provided but the DPNV windings are provided also with the associated power electronics to provide active vibration suppression.

In one embodiment, the at least one stator winding comprises at least two phase windings, each phase winding having four groups of coils connected in a bridge configuration, wherein the first set of terminals are disposed at a first pair of opposite corners of each bridge configuration and the second set of terminals are disposed at a second pair of opposite corners of each bridge configuration different than the associated first pair of opposite corners. Each inverter can be isolated from each other and from a voltage source connected to the first set of terminals.

In another embodiment, the at least one stator winding comprises at least two phase windings, each phase winding having two groups of coils connected in series with respect to each of the second terminals and wherein a first terminal of the set of first terminals is located between the two groups of coils of each phase winding. The second terminals can form a virtual neutral to current carried by each of the first terminals so that current carried by the first terminals have two parallel paths.

In either of the foregoing embodiments, each of the second terminals of each phase winding can be electrically connected to each other. The electrical connection between each of the second terminals can comprise a short or comprise an inverter providing at least two voltage levels.

The motor can include a first plurality of switching devices electrically connecting the first set of terminals to a power source, and a control circuit configured to operate the plurality of switching devices as an inverter to provide at least two voltage levels. If desired, a second plurality of switches can electrically connect the second set of terminals to the power source on a voltage bus common with the first plurality of switches, and wherein the control circuit is configured to operate the second plurality of switching devices to operate as a second inverter to provide at least two voltage levels. In an alternative embodiment, the second plurality of switches electrically connect the second set of terminals to a second power source, and the control circuit is configured to operate the second plurality of switching devices as a second inverter to provide at least two voltage levels.

If desired, the motor can comprise a plurality of switching devices electrically connecting the second set of terminals to one or more power sources, and a control circuit configured to operate the plurality of switching devices as an inverter to provide at least two voltage levels and to control zero sequence current flow.

In any of the foregoing embodiments, the control circuit is configured to control current through the first set of terminals to operate as a motor and further configured to control current to operate as a generator, wherein when operated as a generator, generated current is provided to the second set of terminals. If desired, when operated as a generator, the control circuit can control current to the second set of terminals as rotational speed of the rotor decreases.

Also in any of the foregoing embodiments, the stator can have a first stator winding and a second stator winding, where each winding is configured to form p pole pairs to produce a first magnetic field to rotate the rotor about the axis of rotation and configured to produce a second magnetic field of either one pole pair or p±1 pole pairs to create forces radial to the axis of rotation. In this embodiment, each stator winding hays two sets of terminals, a first set of terminals for carrying current that produces the first magnetic field in the air gap having p pole pairs to rotate the rotor about the axis of rotation and a second set of terminals for carrying current that produces the second magnetic field in the air gap having either one pole pair or p±1 pole pairs to create the forces radial to the axis of rotation. The second set of terminals experience no motional-electromotive force when the rotor is centered on the axis of rotation. In one embodiment, the first stator winding is axially spaced apart along the axis of rotation from the second stator winding. In other embodiments, such spacing may not exist. Any of the foregoing features alone or in combination as described above can be applied to a motor with at least two windings.

In another embodiment, a motor includes a rotor used in conjunction with a stator to produce a magnetic field in the air gap having p pole pairs, wherein a single cross section of the rotor taken orthogonal to an axis of rotation comprises iron having a structure forming p teeth. The stator has a first stator winding and a second stator winding. Each stator winding has two sets of terminals, a first set of terminals for carrying current that produces the first magnetic field in the air gap having p pole pairs to rotate the rotor about the axis of rotation and a second set of terminals for carrying current that produces the second magnetic field in the air gap having either one pole pair or p±1 pole pairs to create the forces radial to the axis of rotation. The second set of terminals experience no motional-electromotive force when the rotor is centered on the axis of rotation. In this embodiment, the first and second stator windings are configured in one of two topologies: a first topology wherein each stator winding comprises at least two phase windings, each phase winding having four groups of coils connected in a bridge configuration, wherein the first set of terminals are disposed at a first pair of opposite corners of each bridge configuration and the second set of terminals are disposed at a second pair of opposite corners of each bridge configuration different than the corresponding first pair of opposite corners, and wherein the phase windings of the first and second stator windings are connected in series using the first terminals of the first and second stator windings, or a second topology having a first power source and a second power source, wherein each stator winding comprises at least two phase windings, each phase winding having two groups of coils connected in series with respect to each of the second terminals and wherein a first terminal of each set of first terminals is located between the two groups of coils of each phase winding, and wherein the first terminals of a first stator winding carry current from the first power source and the first terminals of a second stator winding carry current from the second power source. One or more of the features described above can be incorporated into this embodiment as desired.

Yet another aspect of the invention is an AC homopolar motor comprising a plurality of windings, a stator configured to support the windings, the windings being configured to generate radial forces orthogonal to the rotational axis, and a rotor rotates around the stator core. A flywheel can be connected circumferentially around the rotor. The motor or flywheel system significantly decreases idling losses, increase energy density, and decrease cost over a design having a permanent magnet motor, while the ac homopolar motor can have a torque density comparable to that of a permanent magnet motor. Any one or more of the foregoing features can be included in the motor or flywheel system.

BRIEF DESCRIPTION OF THE DRAWINGS

FIG. 1B is a schematic cross section of an ac homopolar motor or a consequent pole motor.

FIG. 2A is table illustrating stator windings of a conventional bearingless motor.

FIG. 2B is a table illustrating stator windings for a DPNV winding.

DETAILED DESCRIPTION OF ILLUSTRATIVE EMBODIMENTS

Generally, an alternating current (ac) homopolar motor, also known as a homopolar inductor alternator and a synchronous homopolar motor has a robust rotor structure, uses stator-side current excitation, and has its poles in parallel with the magnetizing magnetomotive force (MMF), which means that no additional ampere-turns of field winding current are required when increasing the number of poles. These advantageous features are weighed against the motor's low torque density, which arises from the fact that it only utilizes one-half of the iron's magnetic circuit at any location. However, for designs where minimum loss is a key objective, the ac homopolar motor can achieve nearly the same torque density as conventional synchronous motors. Interest exists in implementing the ac homopolar motor as a high-speed motor, a super-conducting motor, and a high-frequency generator. However, as discussed below, it is believed use of the bearingless outer-rotor ac homopolar motor in a flywheel energy storage system has not been considered. Unlike a conventionally-used permanent magnet (PM) motor, the ac homopolar motor's current-based excitation can be reduced during times of idling to nearly eliminate self-discharge.

For bearingless versions of classical synchronous motors to create radial force, a p±1 pole-pair magnetic field must be created in the airgap to disrupt the otherwise symmetric p polepair magnetic field. To produce a constant direction force, this p±1 pole-pair flux must rotate with the p pole-pair flux. This requires an ac suspension current, high-bandwidth angular position sensors, and imposes stringent control requirements. On the other hand, bearingless ac homopolar and consequent pole motors with at least 8 poles are able to produce a constant direction force with dc suspension current, regardless of the rotor's angular position. This substantially reduces the cost and complexity of the bearingless motor drive.

Figure 1A:
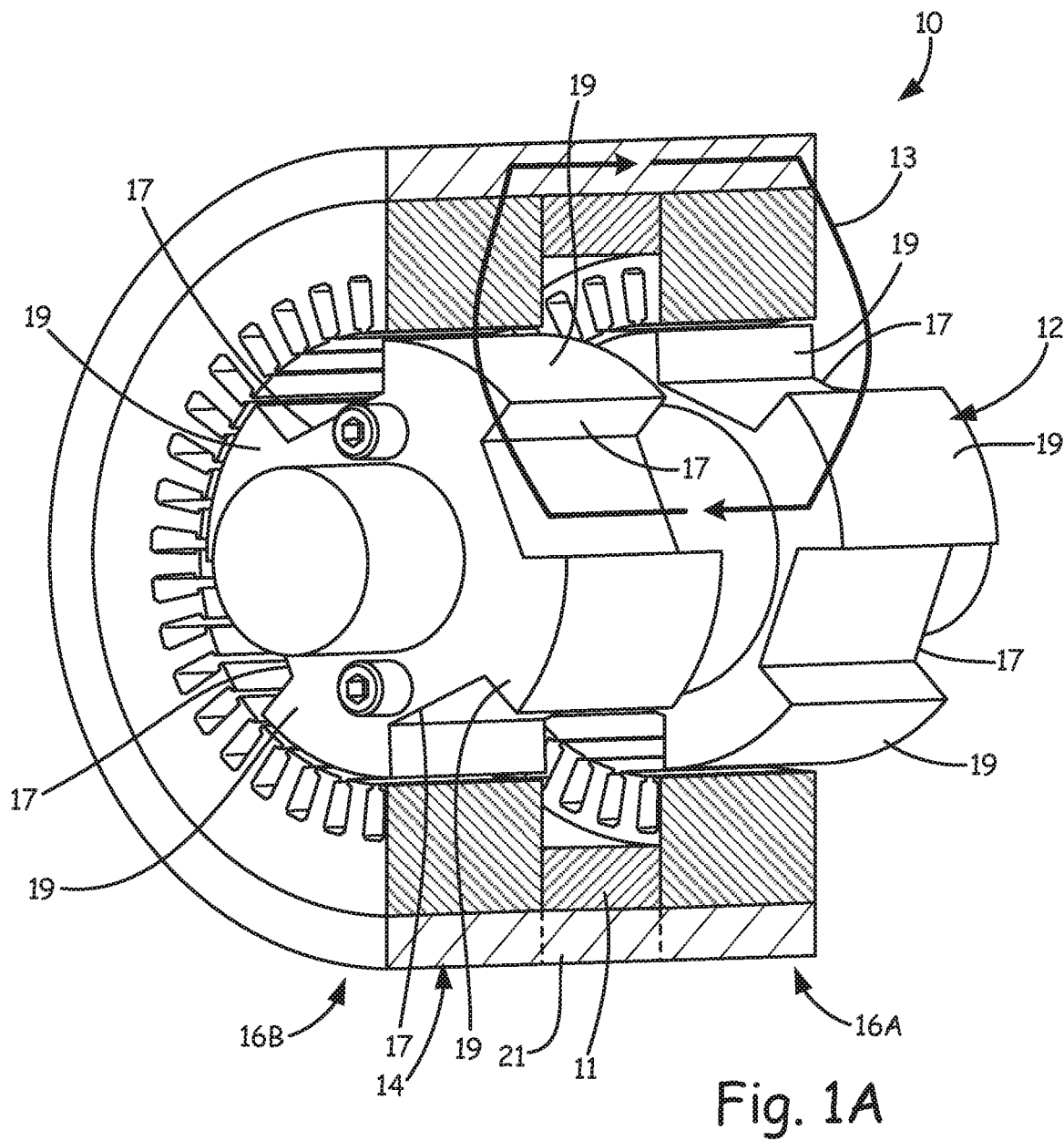
FIG. 1A is a perspective view of an ac homopolar motor with portions removed.
Figure 1B:
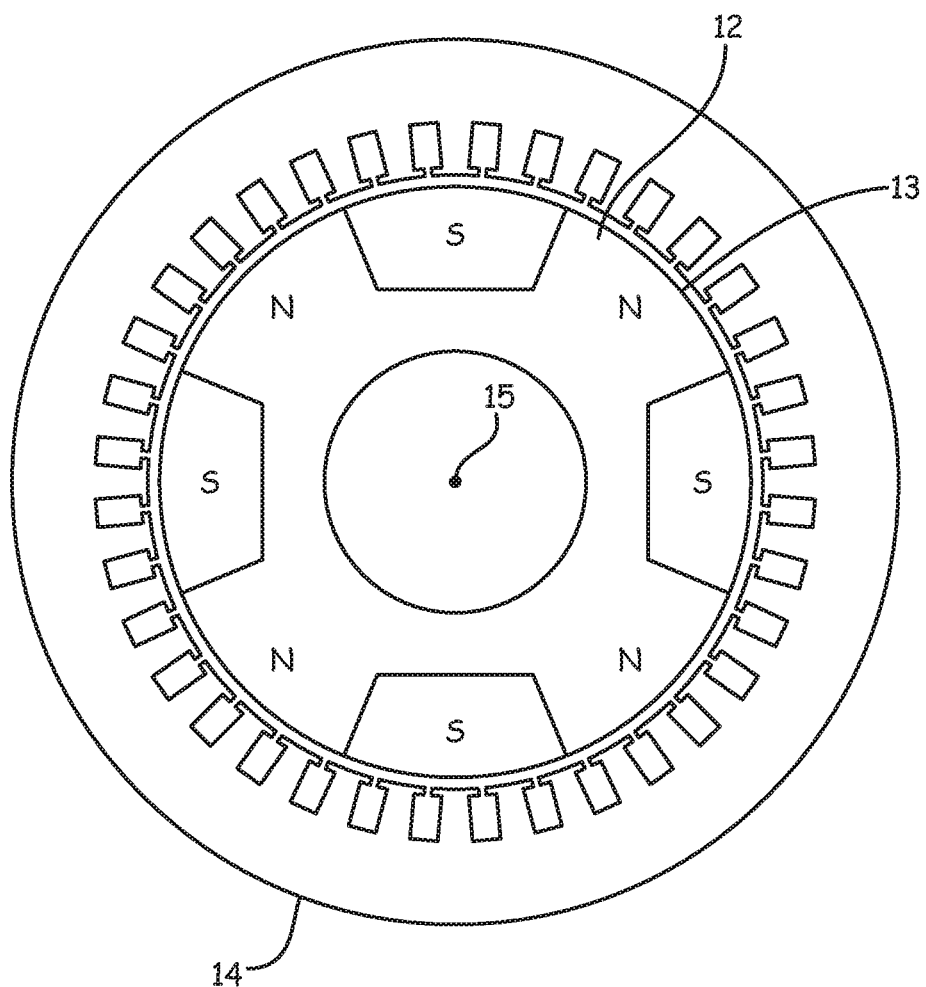
FIGS. 1B and 1C are schematic cross sections of an ac homopolar motor or a consequent pole motor.
Figure 1C:
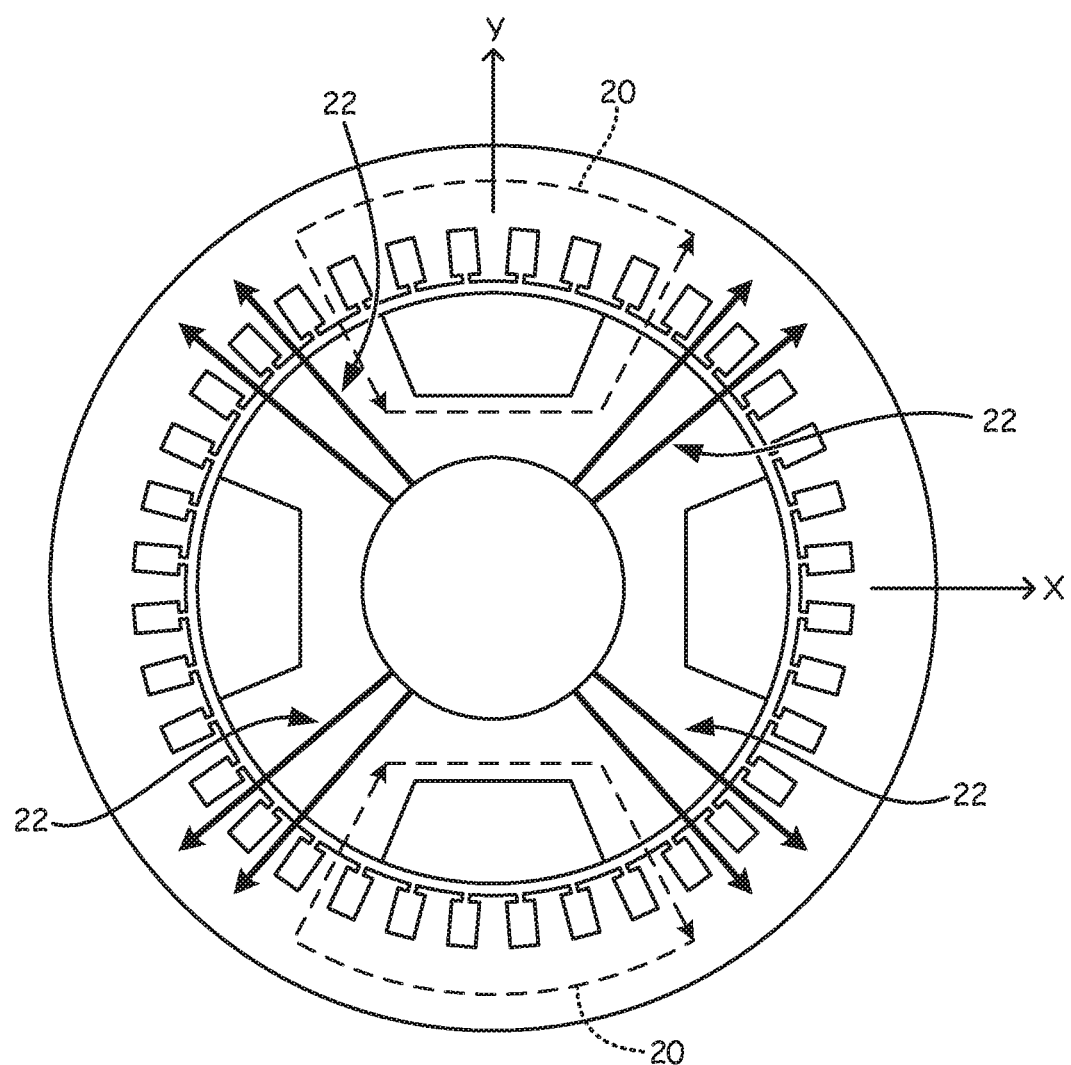
Figure 9A:
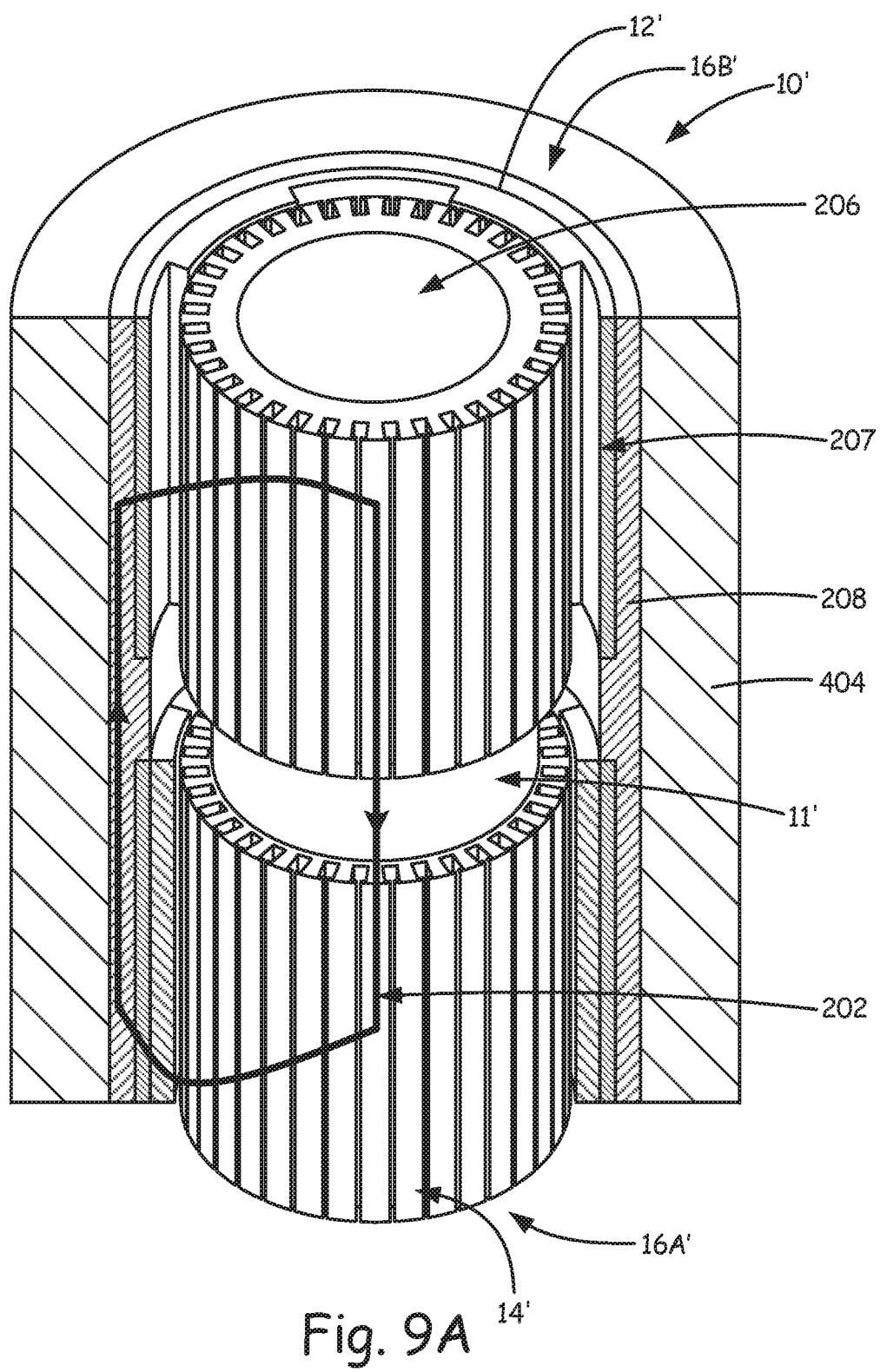
FIG. 9A is a perspective view of an ac homopolor with an outer rotor.

A diagram of a bearingless ac homopolar motor 10 explaining torque and radial force production is depicted in FIGS. 1A-1C. The motor 10 includes a rotor 12 and a stator 14 forming two separate rotor/stator sections (bottom motor 16A and top motor 16B), each with its own suspension winding (not illustrated in FIG. 1 but schematically in FIGS. 4A and 4B) so that it is able to produce radial forces in two planes, giving it four degrees of freedom. It should be noted the embodiment illustrated is for a motor 10 having an inner rotor 12 and outer stator 14 although a bearingless ac homopolar motor 10' having an outer rotor 12' and inner stator 14' design as illustrated in FIG. 9A is also contemplated. FIG. 1A is a 3-D cross-section, while FIG. 1B is an axial cross-section view of the magnetization (represented by north (N) and south (S) poles) of the rotor 12 created by a stationary field winding 11 and/or permanent magnets, which is the source of the magnetizing MMF causing flux to flow along path 13 illustrated in FIG. 1A. The rotor 12 used in conjunction with the stator 14 produce a magnetic field in an air gap 13 having p pole pairs. The cross-section view of FIG. 1B of the rotor 12, which is taken orthogonal to an axis of rotation 15 comprises iron having a structure forming p teeth (4 teeth by way of example in FIG. 1B but this should not be considered limiting in that two or more teeth can be present). The stator 14 has at least one stator winding (illustrated in FIGS. 4A and 4B) configured to form p pole pairs to produce a first magnetic field to rotate the rotor 12 about the axis of rotation 15 and configured to form either one pole pair or p±1 pole pairs to produce a second magnetic field to create forces radial to the axis of rotation 15.

At this point it should be noted as used herein a motor having a winding where the suspension current creates a magnetic field in the airgap that has "one pole pair" also has p greater than two. Nevertheless, within the scope of the invention is a motor characterized by the suspension current creating a magnetic field in the airgap having p±1 pole pairs, where p equals two and the suspension magnetic field has one pole pair.

FIG. 1C illustrates magnetic field 20 created by an x-phase suspension winding interacting with the magnetic field produced by the magnetizing MMF to generate an x direction radial force. A similar situation occurs for radial forces (not shown in FIG. 1C) produced by a y-phase suspension winding so as to create an arbitrary direction radial force in a common x-y plane. It should be noted that a separate suspension winding spans each rotor/stator section 16A, 16B of an ac homopolar motor resulting in four degrees of freedom in the magnetic suspension.

Briefly, the magnetic field in each airgap of the bearingless ac homopolar motor 10 is created by three MMFs: a first MMF created by one or more of a dc field winding 11 and/or permanent magnets in region 21 of the stator sleeve which is fixed to the stator 14 and wraps around the rotor 12 circumferentially and/or permanent magnets mounted in slots 17 between rotor teeth 19; a second MMF created by a p pole pair torque winding located in the stator slots (if slots are used, a stator without slots can also be used) and spanning a full axial length of the motor 10; and a third MMF created by a one pole pair or p±1 pole pairs suspension winding which shares slot space with the stator winding but only spans a single rotor/stator section 16A, 16B. It should also be noted a similar description applies to a bearingless consequent-pole motor, with the exception that the first MMF is created by permanent magnets mounted in slots 17 between rotor teeth 19 and the motor may have only a single rotor/stator section (16A or 16B). It should be noted either the bearingless consequent pole motor or the bearingless ac homopolar motor may have multiple stator/rotor sections utilizing a single shaft. FIGS. 1B and 1C are also illustrative of a consequent motor, which has a similar iron core rotor.

Dual Purpose No Voltage Windings

Combining the suspension and torque windings into a single set of coils means having a winding with multiple sets of terminal connections, where flowing current into one set of terminal connections creates a one pole pair or p±1 pole pair MMF (for the creation of suspension forces) and flowing current into another set of terminal connections creates a p pole pair MMF to rotate the rotor. Furthermore, the phrase "no voltage" means that the set of terminals for the one pole pair or p±1 pole pair winding must experience no motional-EMF from the rotor's rotation.

To explain the DPNV winding and highlight differences with conventional bearingless winding design, an example design based around an 8-pole, 36-slot stator is provided, first with a conventional bearingless winding schematic structure is illustrated at 40 in FIG. 2A, while a DPNV winding schematic structure is illustrated at 42 (FIG. 2B). A 3-phase, double-layer, fractional-slot winding has been designed in the usual way with a phasor diagram and 60° phase belts to produce torque. Note that this is a standard winding used in 8-pole motors. In the conventional winding structure 40, a 2-pole suspension winding (denoted by subscript "s") is added to the same slots to achieve a bearingless design. Hence, the final layout of the conventional bearingless winding structure 40 consists of three layers: the double layer torque winding (identified as "Top" and "Mid") plus the single layer suspension winding (identified as "Bot"). The suspension winding thus occupies a certain amount of slot space, determined by the design's required radial force capability, which is now unavailable to the torque winding.

Figure 2C:
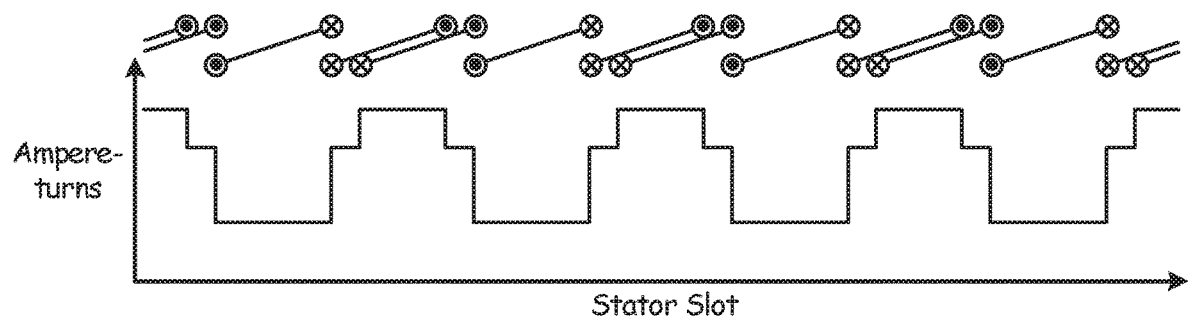
FIG. 2C is an airgap MMF diagram with the DPNV winding excited from current flowing into torque terminals.
Figure 2D:
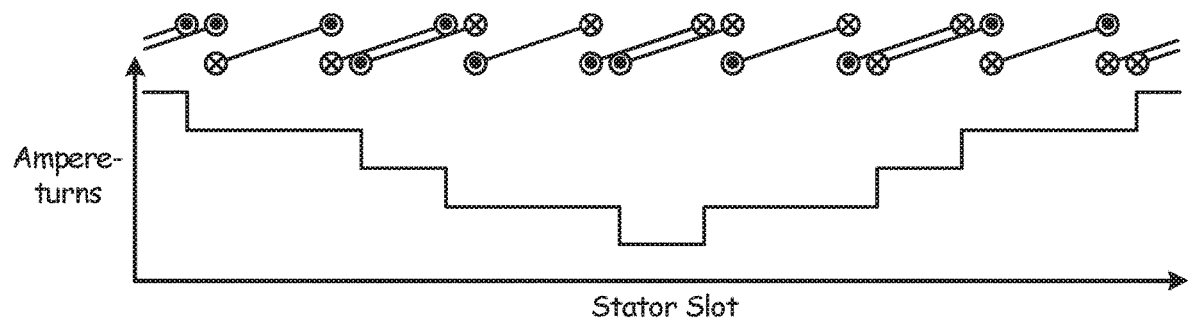
FIG. 2D is an airgap MMF diagrams with the DPNV winding excited from current flowing suspension terminals.
Figure 3:
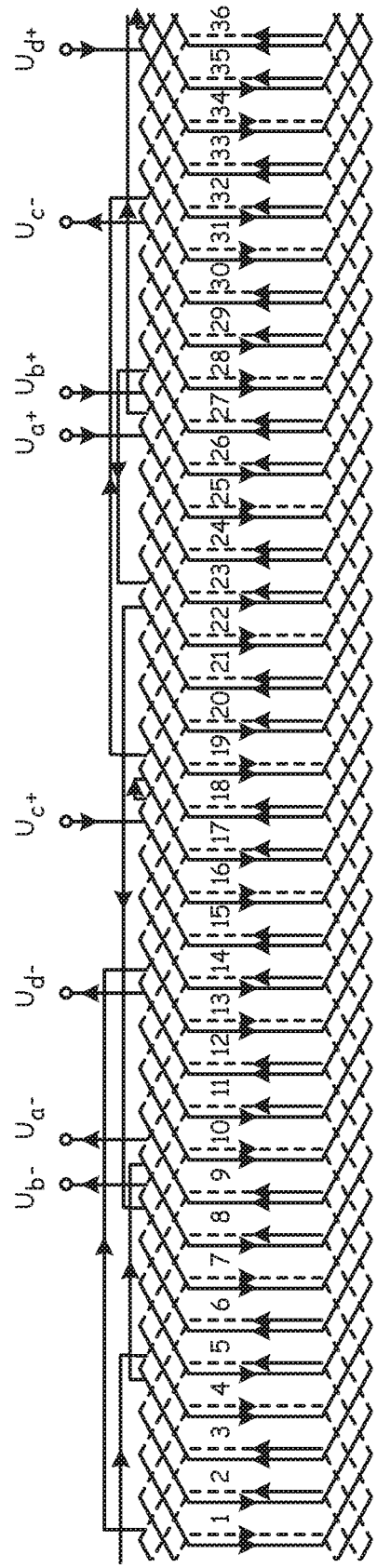
FIG. 3 is a winding schematic illustrating how the connections are implemented in FIG. 2B.

In the DPNV approach illustrated in FIG. 2B, no additional or separate suspension winding is required. Instead, certain end-connections or terminals of the torque winding are brought out which become the suspension current terminals, discussed below. These terminals connect to the same coils as the torque terminals, but have the direction of half of the coils reversed in order to: 1) have no-motional EMF visible at the suspension terminals and 2) produce a 2-pole MMF in the airgap. The winding layout for the example DPNV design is the same as the previously-described torque winding layout, resulting in a design with two layers ("Top" and "Bot"), shown in FIG. 2B. Airgap MMF diagrams with the DPNV winding excited from current flowing into the torque and suspension terminals are shown in FIG. 2C and FIG. 2D. A winding schematic illustrating how the connections are implemented in FIG. 2B is provided in FIG. 3.

Figure 4A:
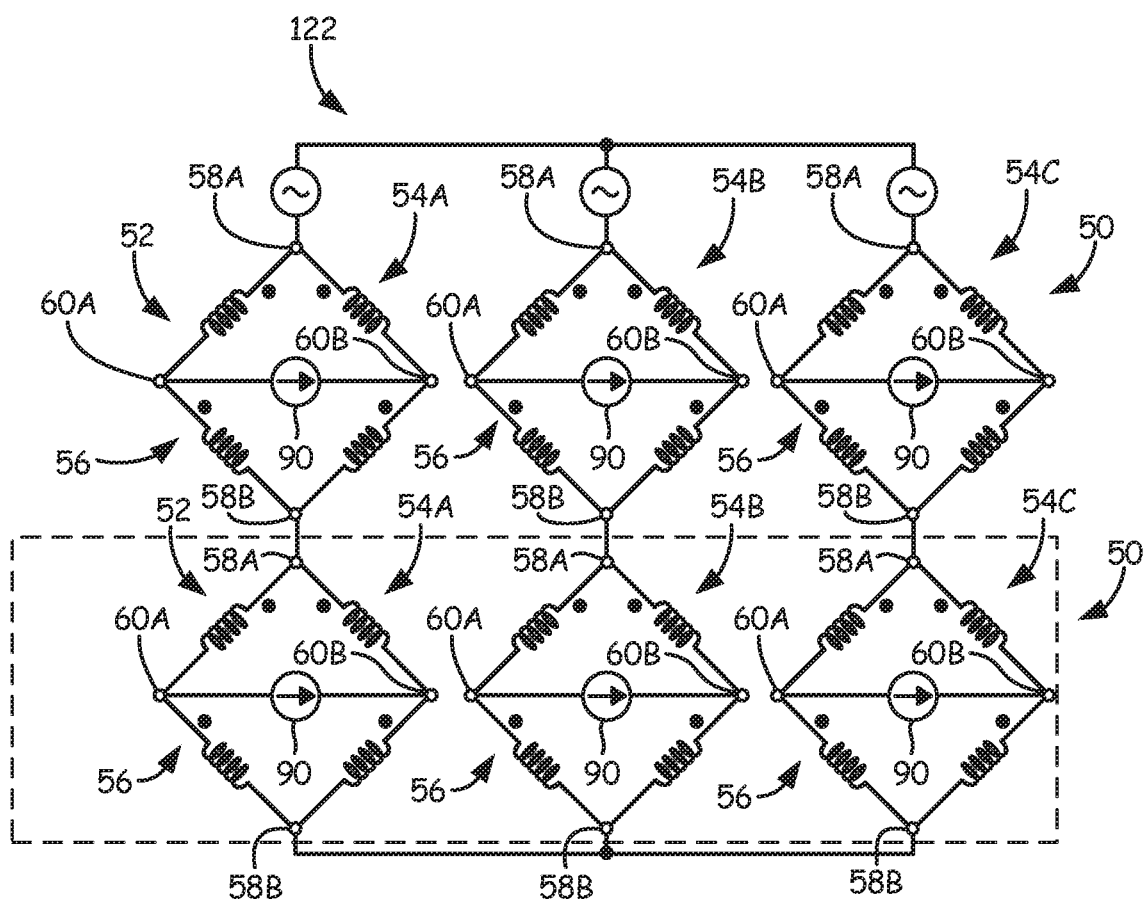
FIG. 4A is a schematic diagram of a first embodiment of an ac homopolor with two DPNV windings, and wherein a consequent pole motor would have a single DPNV winding.
Figure 4C:
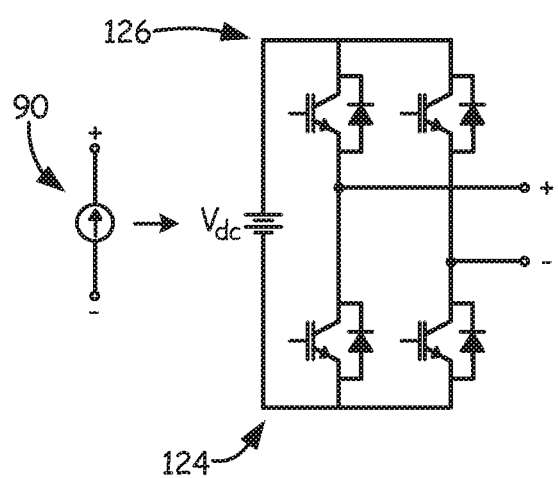
FIG. 4C is an exemplary embodiment of an inverter for the embodiment of FIG. 4A.
Figure 4B:
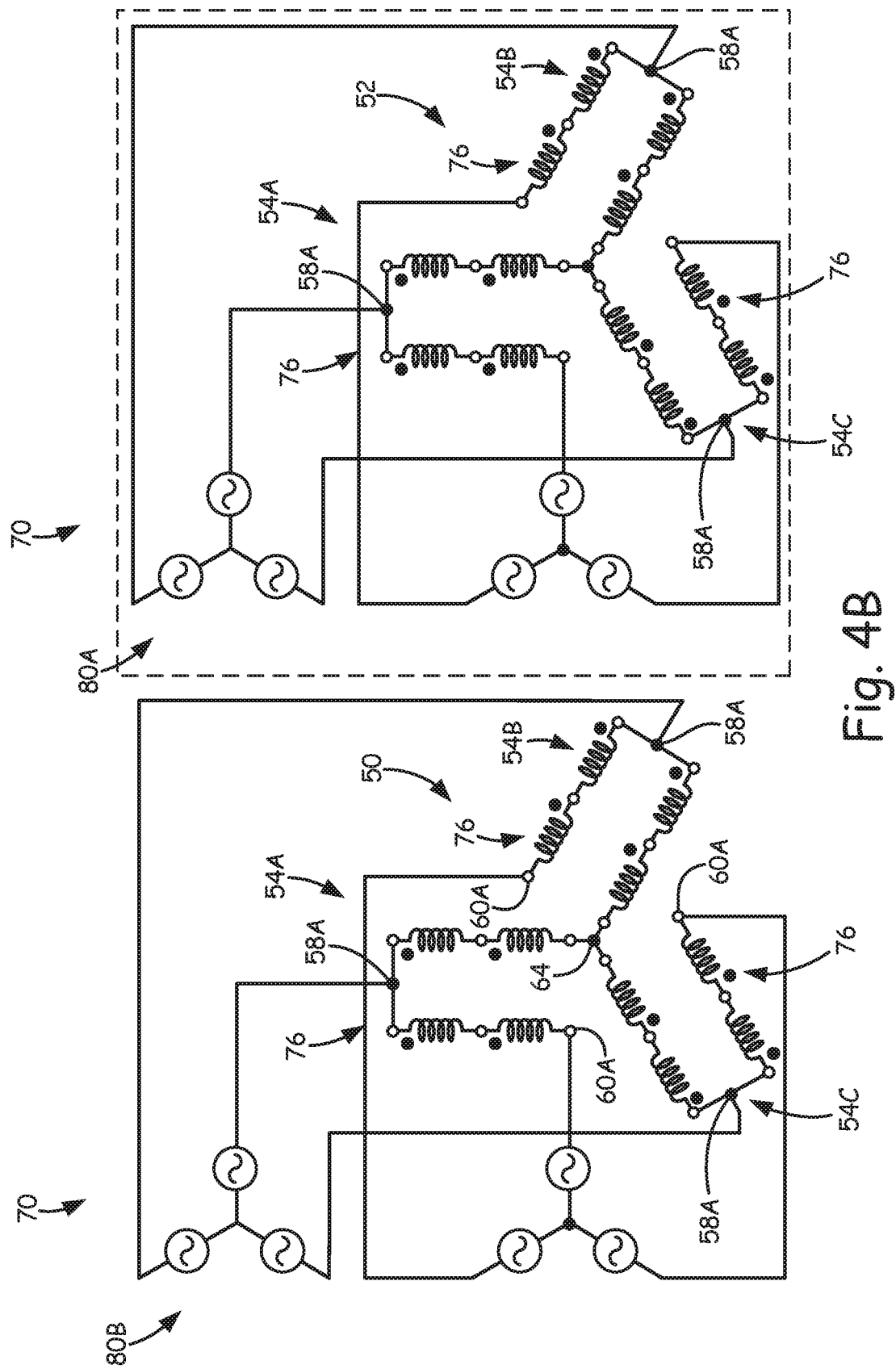
FIG. 4B is a schematic diagram of a second embodiment of an ac homopolor with two DPNV windings, and wherein a consequent pole motor would have a single DPNV winding.

There are two styles of winding or drive configurations for DPNV windings used with a consequent motor or ac homopolar motor herein described that being a "bridge" 50 configuration or topology and a "parallel" configuration or topology 70 illustrated in FIG. 4A and FIG. 4B, respectively. The coil group names correspond to the labels in FIG. 3 where the dotted terminals match the subscript '+'.

Referring first to the bridge configuration 50, each stator winding 52 comprises at least two phase windings (herein by example three 54A, 54B and 54C). Each phase winding 54A, 54B and 54C of each stator winding 52 has four groups of coils 56 connected in a bridge configuration, wherein a first set of terminals 58A and 58B of each stator winding 52 are disposed at a first pair of opposite corners of each bridge configuration and a second set of terminals 60A and 60B of each stator winding 52 are disposed at a second pair of opposite corners of each bridge configuration different than the associated first pair of opposite corners.

Referring next to the parallel configuration 70, each stator winding 52 comprises at least two phase windings (herein by example three 54A, 54B and 54C). Each phase winding 54A, 54B and 54C has two groups of coils 76 connected coils connected in series with respect to each of the second terminals 60A and wherein a first terminal 58A of the set of first terminals is located between the two groups of coils of each phase winding 54A, 54B and 54C Note the same reference numbers for the stator winding 52, the first set of terminals 58A and the second set of terminals 60A are used in both the bridge and parallel configurations since each configuration still has the winding layout illustrated in FIG. 3 for a 36 slot stator by way of example. However, a neutral 64 is present in both the bridge and parallel configurations.

In summary, common to both the bridge configuration 50 and the parallel configuration 70 are one or more stator windings 52 having two sets of terminals, the first set of terminals 58A for carrying current that produces the first magnetic field in the air gap having p pole pairs to rotate the rotor 12 about the axis of rotation 15 and the second set of terminals 60A for carrying current that produces the second magnetic field in the air gap having either one pole pair or p±1 pole pairs to create the forces radial to the axis of rotation 15, wherein the second set of terminals experience no motional-electromotive force (across terminals 60A and 64 in the parallel configuration 70, across terminals 60A and 60B for the bridge configuration 50) when the rotor 12 is centered on the axis of rotation 15.

To avoid circulating currents caused by a mismatch between the top and bottom sections 16A, 16B, the phase windings 54A, 54B and 54C of each phase in the bridge configuration 50 are connected in series via the first terminals 58A,58B. In the parallel configuration 70, separate torque inverters 80A and 80B provide current to each stator winding 52 via the first (torque) terminals 58A for each rotor/stator section. Again, for the bearingless consequent-pole motor, either the bridge configuration 50 or parallel configuration 70 can be used, but with, for example, the regions having broken lines in each of FIGS. 4A and 4B removed so as to have only one rotor/stator section (one stator winding 52) as described above.

Figure 5:
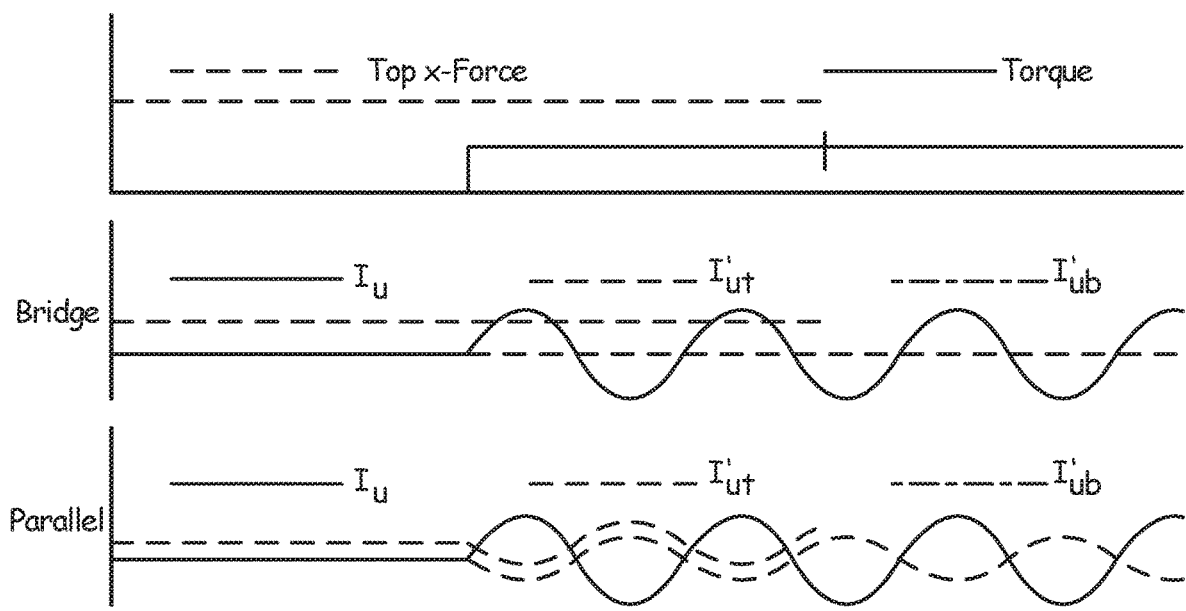
FIG. 5 are plots of idealized drive current waveforms for producing simultaneous force and torque for an embodiment where current through the suspension terminals creates a one pole pair magnetic field in the air gap.

Idealized drive current waveforms for producing simultaneous force and torque are illustrated in FIG. 5 for the embodiment where current through the second (suspension) terminals creates a one pole pair magnetic field in the air gap. The top plot in FIG. 5 depicts a torque and x axis force being produced by the motor. The currents are referenced as positive flowing into their respective terminals. The bridge configuration 50 (FIG. 4A) uses a dc suspension terminal current to produce a constant force. The parallel configuration 70 (FIG. 4B) suspension terminal must carry half of the ac torque current in addition to the dc suspension current. Referring to both FIGS. 4A and 4B, note that with a positive torque current, a positive suspension current will increase the total current in coils 56, 76 identified "b" and "d" of each of the groups 56, 76 and decrease the total current in coils "a" and "c" of each of the groups 56, 76. The drive must enforce the maximum coil current rating by limiting the torque output during any event which requires high suspension current.

There are advantages and disadvantages of each DPNV configuration. Each suspension terminal of the bridge phase winding (FIG. 4A) has the advantage of only having to carry current responsible for creating radial forces (i.e. from a suspension inverter 90), whereas each suspension terminal of the parallel phase winding (FIG. 4B) must also carry one-half of the torque terminal current of that phase winding. This puts the parallel structure at a disadvantage in terms of the drive efficiency, control complexity, and exposes reliability concerns for levitation in the event of a failure in the torque inverters 80A, 80B. In terms of the amount of hardware needed to implement each inverter, the bridge configuration 50 is at a significant disadvantage, as each of the suspension current sources 90 in FIG. 4A typically must be implemented as an isolated single phase inverter.

Power Electronic Drives

The current of each coil group 56, 76 is a superposition of the suspension and torque terminal currents. Based on the amount of suspension current required, the drive must actively limit the maximum allowable torque current so as to avoid exceeding the current rating in any coil group 56, 76. This is different from a conventional bearingless winding, where separate coils carry torque and suspension current and the maximum torque current (and therefore torque capability) is permanently fixed. For this reason, the DPNV winding designs are highly advantageous in applications where the amount of required suspension current varies significantly during operation; here, a motor with a DPNV winding is able to carry a greater torque producing current (and therefore create more torque) during operating times when low-suspension current is required.

Exemplary power electronic implementations of the parallel and bridge DPNV drive configurations are discussed using single- and three-phase, two-level inverters. (Although this should not be considered limiting, for example, if desired inverters operating with more than two voltage levels can be used.) These configurations are contrasted against the traditional bearingless winding implementation, for which the complete drive is composed of standard three-phase motor drives attached to each winding; that is, separate three-phase, two level inverters attached to the suspension and torque windings which share a common voltage bus. The results of the discussion are summarized in Table 1. Note that the conventional bearingless winding for the ac homopolar motor has one torque winding which spans the entire motor length and separate suspension windings spanning each airgap. This requires one three-phase inverter for the torque winding and two three-phase inverters for the suspension windings.

TABLE 1

Comparison of power electronic implementations

| | Bridge Single airgap | Homopolar | Parallel Single airgap | Homopolar | Parallel isolated Single airgap | Homopolar | Conventional Single airgap | Homopolar |
|---|---|---|---|---|---|---|---|---|
| Switches | 18 | 30 | 12 | 24 | 12 | 24 | 12 | 18 |
| Current sensors | 5 | 8 | 5 | 10 | 4 | 8 | 4 | 6 |
| Isolated voltage buses | 4 | 7 | 1 | 1 | 2 | 2 | 1 | 1 |
| Usable fraction of sus. voltage bus | 1 | | ½ | | $\frac{1}{\sqrt{3}}$ | | $\frac{1}{\sqrt{3}}$ | |
| Usable fraction of torque voltage bus | $\frac{1}{\sqrt{3}}$ | | ½ | | $\frac{1}{\sqrt{3}}$ | | $\frac{1}{\sqrt{3}}$ | |
| Sus. inverter current rating | 2× coil rating | | coil rating | | coil rating | | coil rating | |
| Sus. inverter voltage rating | ≤torque inverter rating | | torque inverter rating | | ≤torque inverter rating | | ≤torque inverter rating | |

Parallel Configuration Winding Drive

Figure 8A:
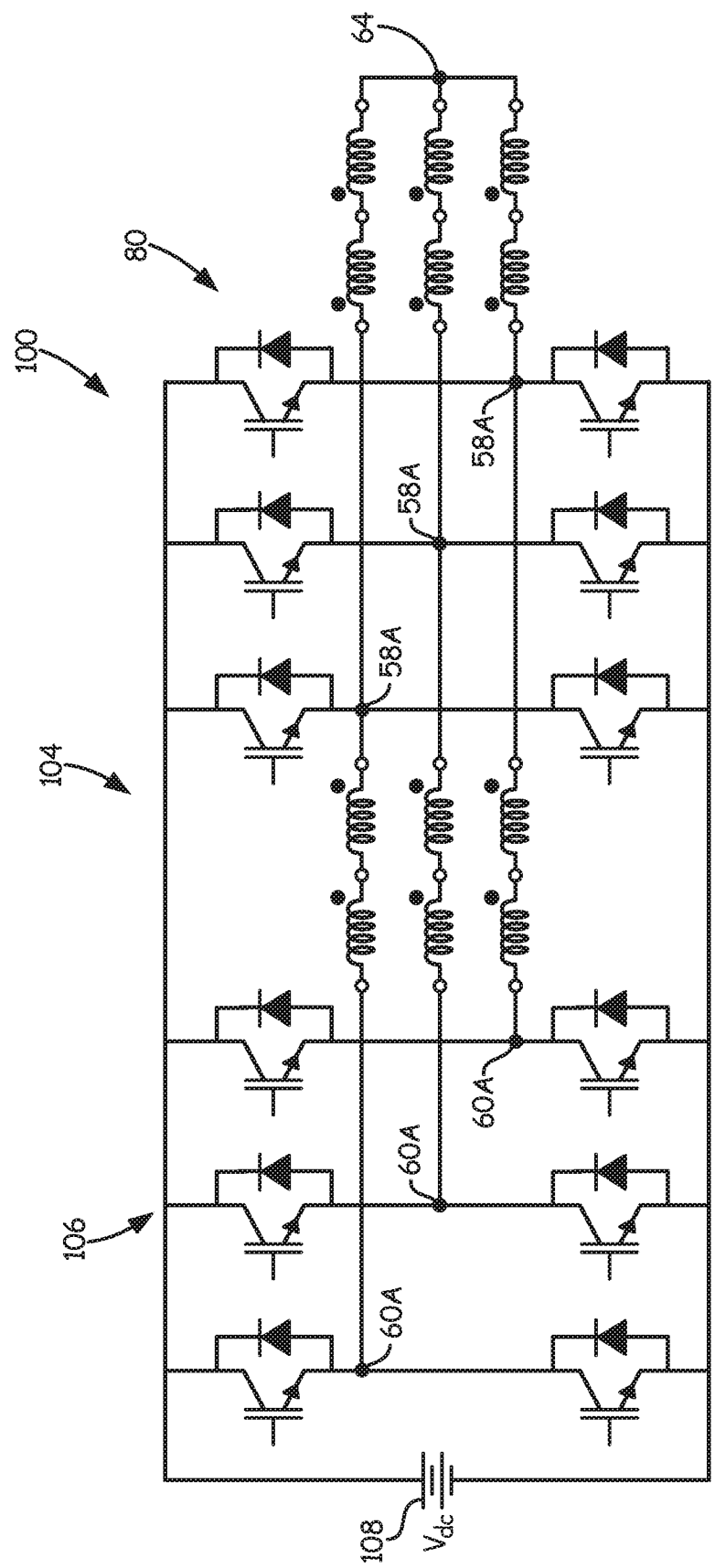
FIG. 8A is a first embodiment of inverters for the winding configuration as illustrated in FIG. 4B.

In the exemplary embodiment, a parallel configuration DPNV drive 100 can be implemented using three-phase, two-level inverters sharing a common voltage bus 104, as shown in FIG. 8A. A first inverter 80 (see also FIG. 4B) provides current to the first set of terminals 58A, while a second inverter 106 provides current to the second set of terminals 60A. Power source 108 schematically represents rectifiers, capacitors, DC-DC isolating converters, etc. that convert typically one or more phases of an AC to the DC voltage represented, or alternatively one or more batteries or DC generators or other forms of DC power. Table 1 provides the number of switches for both types of motors, i.e. the consequent pole motor ("single airgap" in Table 1) and the ac homopolar motor ("homopolar" in Table 1), each considered in their simplest forms. Care must be taken to avoid circulating currents in a single stator winding between the two inverters in the parallel winding configuration. There are two primary factors that can lead to significant circulating currents include:

(1) instantaneous mismatch between the applied common mode voltages at the terminals of each inverter; and/or
(2) unbalanced phase impedances or the unexpected presence of a small voltage at the suspension terminals.
Factor (1) prevents the use of modulation schemes that apply different common mode voltage, such as the widely used Conventional Space Vector Pulse Width Modulation (CSVPWM) which allows output phase voltages as large as $$\frac{V_{dc}}{\sqrt{3}}.$$

The Sine Triangle Comparator PWM method can be used, as it applies a constant common mode voltage when averaged over a switching period, but this limits the output phase voltage to $$\frac{V_{dc}}{2}.$$

Since slight asymmetries in the phase impedance are inevitable and slight variations from the "no voltage" property of the suspension winding may arise, factor (2) requires that current sensors (five in the exemplary embodiment) be used for each drive 100 so that circulating currents can be detected and actively removed.

Figure 8B:
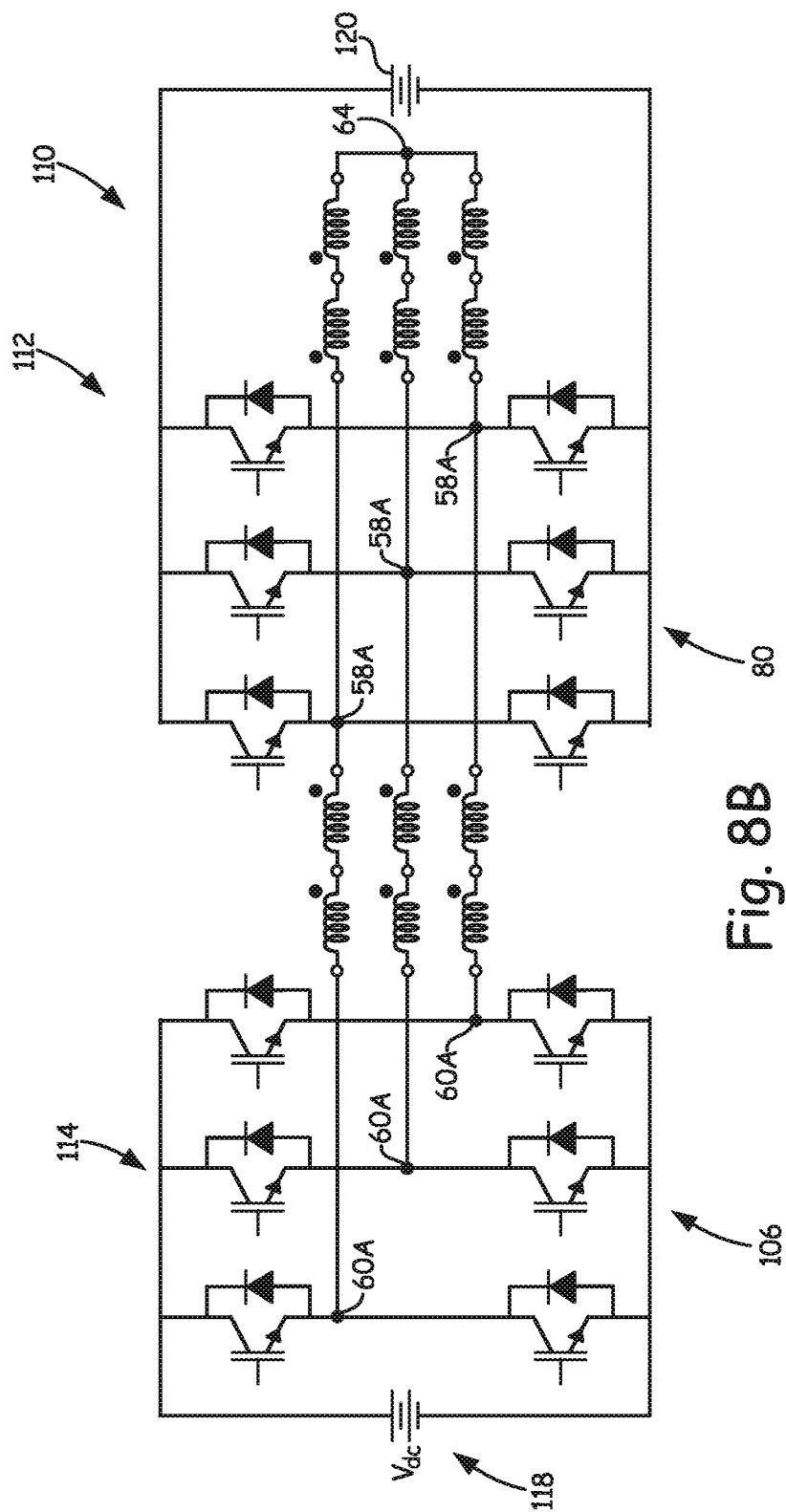
FIG. 8B is a second embodiment of inverters for the winding configuration as illustrated in FIG. 4B.

Alternatively, FIG. 8B illustrates a drive 110 where inverters 80 and 106 are operated from isolated dc buses 112 and 114, respectively to eliminate all concern of circulating currents. In this configuration, CSVPWM can be used and only four current sensors are required for each drive 110 (two current sensors for each three-phase inverter). The suspension inverter voltage bus 114 can now have a different value than the torque inverter bus 112. This is a useful feature because the "no voltage" property of the suspension terminals means that the suspension inverter 106 can utilize a lower voltage bus 114 than the torque or motor inverter 80 in most designs; using a lower bus voltage (for the same output current) results in lower suspension inverter losses and enables the suspension inverter 114 to use less expensive switches that have lower voltage blocking capability. For the bearingless ac homopolar motor, the same dc buses 114 and 112 can also be used in the second drive or inverter set 110 because there is no path for circulating currents between the top and bottom stator windings. This means a single voltage source can be used for $V_{dc,1}$ 118 between the top and bottom stator winding drive or inverter set 110, and a single voltage source can be used for $V_{dc,2}$ 120 between the top and bottom stator winding drive or inverter set 110. Again, power or voltage sources 118, 120 schematically represent rectifiers, capacitors, DC-DC isolating converters, etc. that convert typically one or more phases of an AC to the DC voltage represented, or alternatively one or more batteries or DC generators or other forms of DC power. Note also that providing isolated dc buses 112, 114 for this configuration has the significant downside of requiring additional hardware.

The foregoing discussion of FIG. 8B concerned isolation between sources 118 and 120. However, in an embodiment where source 118 is derived from source 120 in a non-isolated manner, the discussion pertaining to circulating currents in FIG. 8A and accompanying considerations would apply.

Bridge Configuration Winding Drive

The bridge DPNV configuration can be implemented in the exemplary embodiment by using a three-phase, two-level inverter for a motor inverter 122 and isolated H-Bridges 124 for each suspension phase inverter 90, see FIG. 4C. Table 1 provides the number of switches for both types of motors, i.e. the consequent pole motor ("single airgap" in Table 1) and the ac homopolar motor ("homopolar" in Table 1), each considered in their simplest forms. A current sensor must be used on each phase of the suspension terminal connection and on two of the phases of the torque terminal connections. This translates to requiring five current sensors for the motors with a single airgap and eight current sensors for the bearingless ac homopolar motor. Furthermore, each converter 124 must use a dc bus 126 isolated from all other converters. It is therefore concluded that the bridge configuration requires substantially more hardware than the parallel configuration.

However, the bridge configuration has advantages over the parallel configuration. The only risk of zero sequence currents in this configuration is through the suspension terminals, since voltages are applied to each phase's suspension terminal independently from the other phases. The three phase torque inverter 122 can use CSVPWM to obtain a higher output voltage $$\left(\frac{V_{dc}}{\sqrt{3}}\right),$$

and the individual H-Bridges converters 124 are able to apply the full bus voltage as their phase voltage. The H-Bridge converters 124 have to carry twice the suspension current, but none of the torque current, meaning that in designs where the suspension current is normally low, the H-Bridge converters 124 will have less losses in the suspension inverter 90. Furthermore, because the H-Bridge converters 124 are on isolated voltage buses, they can have a lower bus voltage than the torque inverter 122; this has the same advantages that were described for the isolated implementation of the drive 110 for the parallel configuration.

In terms of fault redundancy, the bridge configuration is also at an advantage. Since the torque inverter 122 is completely isolated from the suspension inverters 90. Hence, a failure in the torque inverter circuit or current sensor, would not impact the suspension operation. Furthermore, utilizing isolated voltage buses 126 for each of the H-Bridges converters 124 provides more redundancy, since a shorted-inverter would only disrupt a single suspension phase and it is possible to provide x-y forces with two of the three phases.

Control Considerations

Figure 6A:
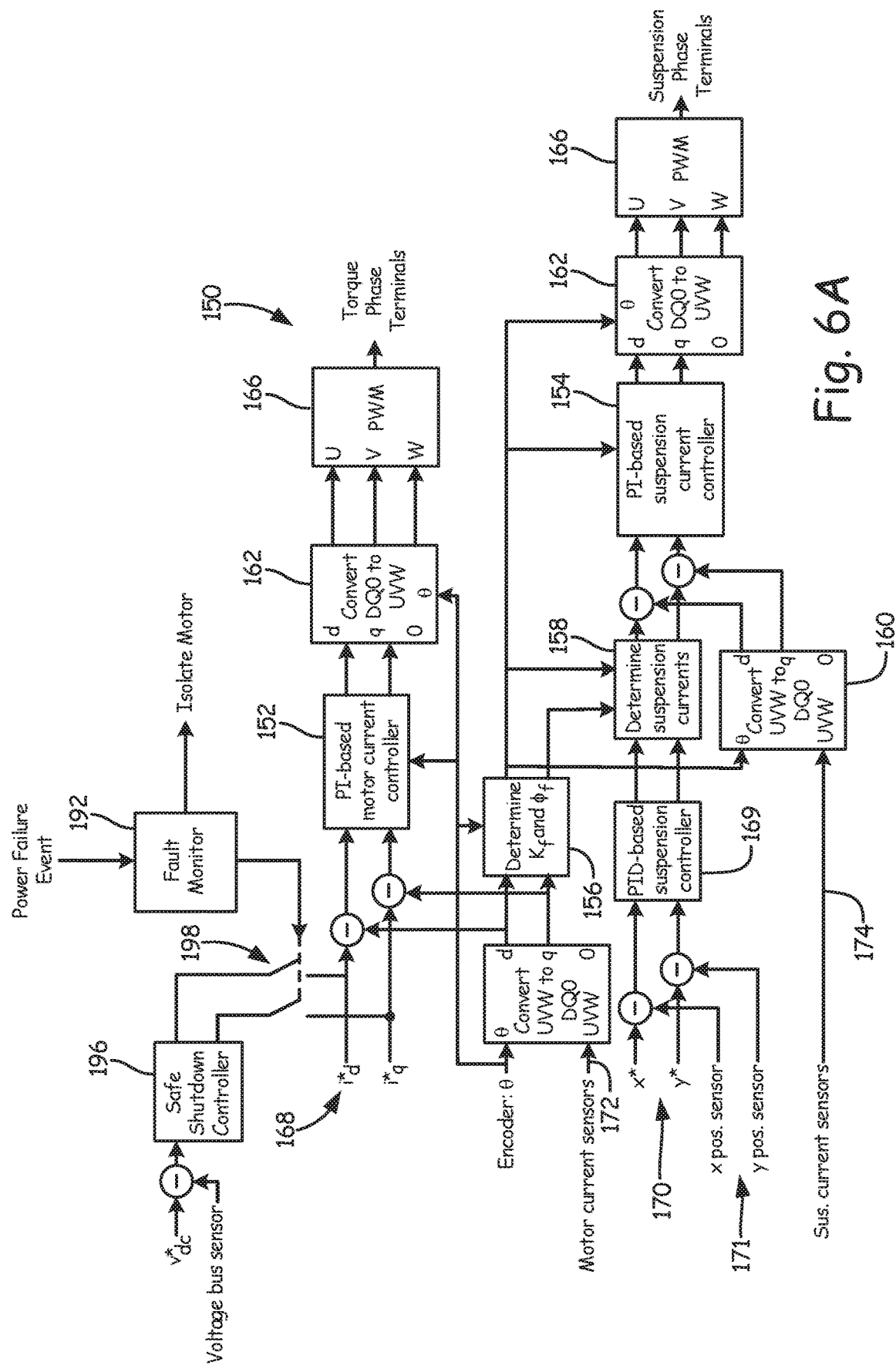
FIG. 6A is a control circuit for an ac homopolar motor or a consequent pole motor for a winding configuration as illustrated in FIG. 4A.
Figure 6B:
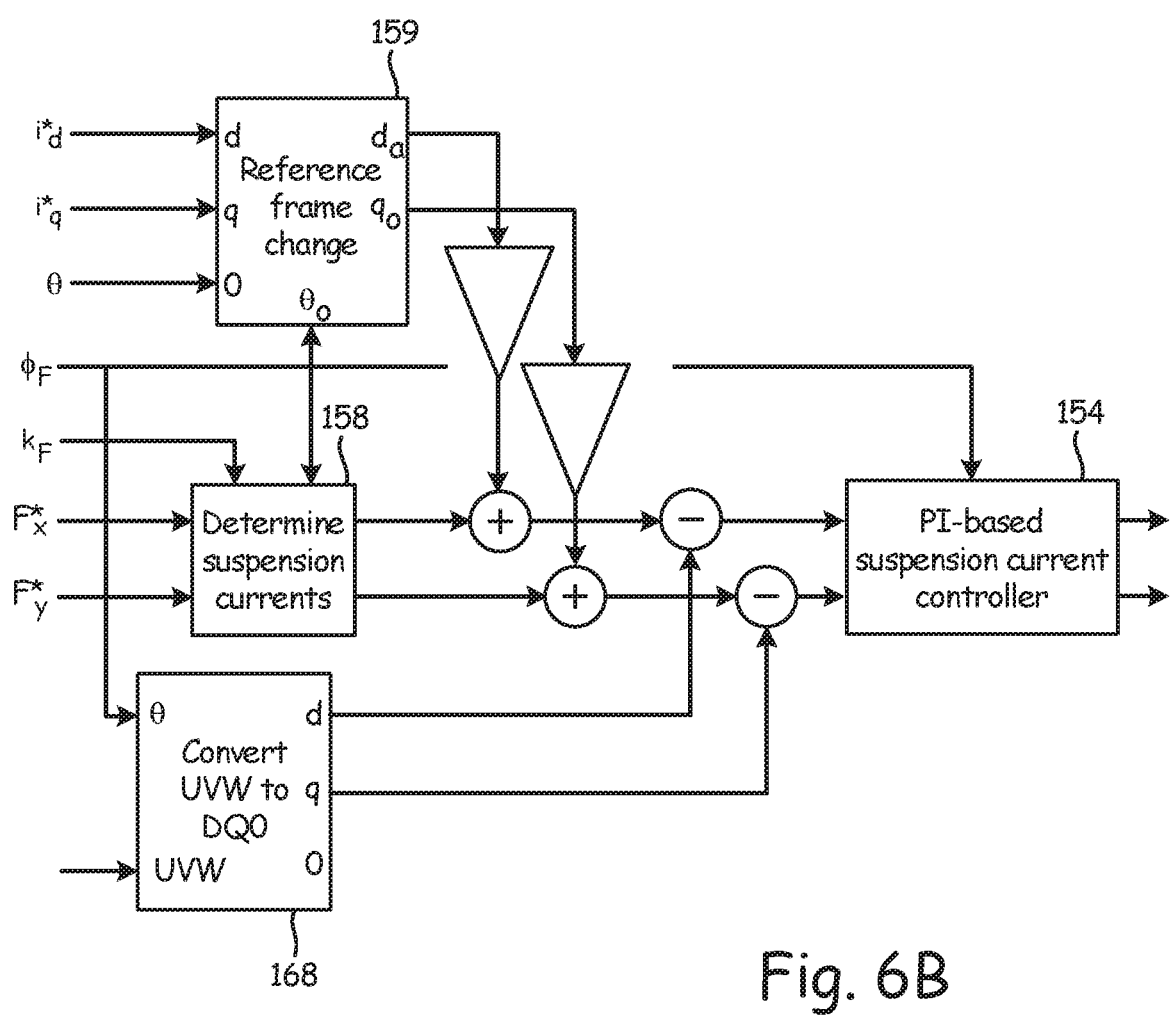
FIG. 6B is a portion of the control circuit of FIG. 6A illustrating additional circuitry for a winding configuration as illustrated in FIG. 4B.

The typical control system 150 for a bearingless motor drive is illustrated in FIG. 6A. This implementation can be used for a bridge configured bearingless drive. In the parallel configuration, the suspension terminals carry half of the torque current, which must be added to the suspension current references. This is shown as a reference frame transformation at block 159 as transforming the torque currents as shown in FIG. 6B. The blocks labeled as "PI-based motor current controller" 152 and "PI-based suspension current controller" 154 correspond to the vector control approach taken in motor drives. The operation of the blocks labeled as "Determine $k_f$ and $\varphi_f$" 156 and "Determine suspension currents" 158 in the case of the bearingless motors where the suspension current creates a magnetic field in the airgap that has one pole pair, $k_f$ is a constant and $\varphi_f=0$ which significantly simplifies these blocks. The meaning of $k_f$ and $\varphi_f$ and their significance to the control of the suspension control are described in detail in the Appendix.

The blocks labeled as "Convert UVW to DQO" 160 and "Convert DQO to UVW" 162 correspond to DQ and inverse-DQ transformations, respectively. The "PWM" 166 blocks represent the interface to the power electronics and the type of pulse width modulation used. (It should be noted alternatives to PWM can be used including but not limited to six-step operation, pulse amplitude modulation and hysteresis control.) For the bridge configuration suspension terminals, this corresponds to the H-Bridges 124 of FIG. 4C; otherwise this corresponds to a three-phase, two-level inverter. PID controller 169 receives the error in the shaft radial position as determined from the reference x/y position of the rotor 12 provided at 170 and the sensed rotor radial position provided at 171 and generates reference forces that need to be applied to the rotor shaft 12, which are then translated to suspension current references by block 158. Motor current sensor inputs are provided at 172, while suspension current sensor inputs are provided at 174.

The DPNV suspension terminals can be modeled as a constant series resistance and inductance. As is standard for vector control, the suspension current controllers are designed in the DQ domain. The suspension DQ transformation is based on the angle $\varphi_F$, which results in the voltage equations below. The bridge configuration has Rsus=R and Lsus=$L_{lkg}$; $L_{lkg}$; the parallel configuration has Rsus=4R and Lsus=$4L_{lkg}$.

$$v_x = Rsusi_x + Lsu\dot{s}i_x - \varphi_F Lsusi_y$$

$$v_y = Rsusi_y + Lsu\dot{s}i_y + \varphi_F Lsusi_x$$

Figure 7:
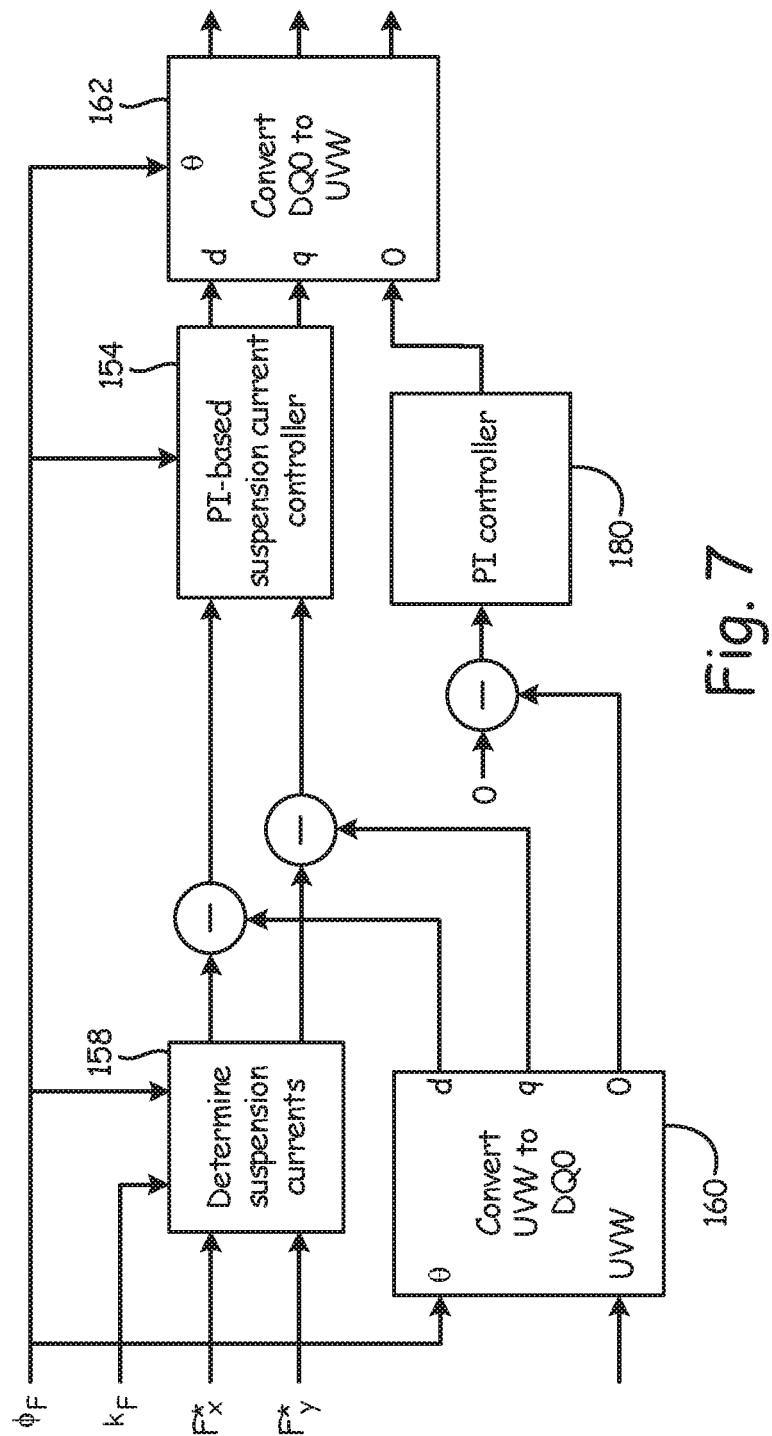
FIG. 7 is a portion of the control circuit of FIG. 6A illustrating additional circuitry for zero-sequence, or circulating, current control.

The implementation of the bridge configuration and the non-isolated implementation of the parallel configuration can experience zero-sequence, or circulating, currents which enter at the suspension terminals. A PI controller 180 with a zero reference can be used to suppress these currents, as shown in FIG. 7. The zero sequence voltage equation can be extracted from the suspension DQ transformation as provided below.

$$v_0 = Rsusi_0 + Lsu\dot{s}i_0$$

In the parallel DPNV drive configuration for bearingless motors where the suspension current creates a magnetic field in the airgap of one pole pair, additional control issues can arise due to the suspension DQ reference frame being stationary and the torque DQ reference frame rotating at the synchronous frequency. This problem can become apparent when constant radial forces are present, which require DC suspension currents. To the torque DQ current controller, these DC suspension currents appear to be rotating backwards at the synchronous frequency. Since PI controllers have difficulty tracking sinusoidal signals, these currents can cause oscillating errors to appear in the DQ motor currents. This issue also arises in other applications, such as active filters and motor drives. One solution to this problem is to add additional integrators to the error signals in a reference frame where the problem signal is DC. For the present problem with parallel DPNV drives for homopolar motors, this means having an additional stationary DQ reference frame for the motor DQ currents, integrating the error as seen in this reference frame, and adding the resulting voltage references to the voltage references generated by the primary motor current controller.

Controlled Shutdown

To ensure stable operation in the event of power failure of components generating power sources 108, 118, 120, 126 and/or a similar power source of inverter 122 or the power source such as but not limited to an AC power grid failing, control circuitry can be included in the controller of FIG. 6A to enable a controlled shutdown of the consequent pole or ac homopolar motors described herein. Referring back to FIG. 6a, a fault monitor 190 monitors conditions of the power source used to provide power sources 108, 118, 120, 126 and/or a similar power source of inverter 122 such as but not limited to for example input voltages from the AC power grid. If a power failure event occurs the fault monitor module 192 will isolate buses of the motor from the power source such as the AC grid by typically opening circuit breakers (not shown). In general, the motor will then be controlled to operate as a generator so as to enable continued operation of the suspension inverters while the motor is slowing down. With isolation of the motor, a shutdown controller 196 is added to the motor drive operation to maintain the system dc bus voltage not shown, but which is or powers power sources 108, 118, 120, 126 and/or a similar power source of inverter 122 through a bi-directional power link (e.g a DC-DC converter) in the case of power sources 108, 120 and a similar power source of inverter 122. Shutdown controller 196 monitors the system dc bus voltage, compares it to the desired system dc bus voltage, and in response generates id* and iq* reference currents which are fed into the control system in a manner that over-rides the system's standard id* and iq* reference currents, (shown schematically by switches 198), where inputs 168 are otherwise then disabled. As indicated above controller 196 effectively transforms the motor into a generator to maintain the dc bus voltage. Since the power for all other circuitry in the system if desired can be derived from the system dc bus voltage, maintaining this voltage enables the system to continue operation and prevent the rotor from touching down until the rotational energy has been exhausted. In a conventional vector control system, with the d-axis aligned with the rotor's direct axis, only the iq* reference current is modified by controller 192, where a negative iq* reference current will cause power to flow back onto the system dc voltage bus. The controller 192 can be implemented in a manner as simple as a proportional (P) or proportional integral (PI) controller. If desired, isolation of the motor could also include connecting additional load as needed to the system dc voltage bus such that the controller 192 slows the motor rotational speed at a higher rate.

Outer-rotor AC Homopolar Motor

In addition to the inner-rotor design illustrated in FIG. 1A, an ac homopolar motor can be implemented in an outer-rotor design. It should be noted the discussion of the DPNV windings and drives discussed at least generally applies to the outer-rotor design. An outer-rotor ac homopolar motor 10' is shown in FIG. 9A. It features variable excitation due to a field winding 11' which is fixed to the stator 14'. The magnetizing flux path 202, depicted in FIG. 9A, is both radial and axial. The harmonics of the magnetic field in the airgap can be controlled by the shape of rotor 12', with the most common rotor shapes having an airgap length profile of a square wave and an inverted sine wave. Since the stator laminations (not specifically shown) and rotor laminations 207 have low magnetic permeability in the axial direction, a solid steel stator shaft 206 and rotor sleeve 208 are used to provide an axial flux path. The difference between the stator lamination inner diameter and outer diameter must be large enough to allow the flux to evenly distribute itself before reaching the stator shaft 206, or eddy currents may be induced in the steel.

The motor 10' only uses half of its magnetic circuit at any location, meaning that the magnetic field produced by the magnetizing MMF is always north-facing in one of the two stator/rotor sections 16A' and always south-facing in the other stator/rotor section 16B'. Herein, the two stator/rotor sections are referred to as the "top" section 16B' and the "bottom" section 16A'. Using only one-half of the magnetic circuit at any location decreases both the torque density and the core losses significantly as compared to a traditional radial flux motor. It should be noted motor 10' includes a stationary field winding 11'.

Outer-Rotor AC Homopolar Motor Flywheel Energy Storage System

Flywheel energy storage has become increasingly popular for applications that require high power, efficiency, and cycle life. Commercial examples include providing frequency regulation to the power grid, serving in uninterruptible power supply (UPS) systems as a temporary energy source until a backup generator can takeover, and providing power during times of acceleration in automobiles, buses, and trains. While flywheel designs often have high energy transfer efficiency (>90%), they have continuous losses that persist in times of idling or free-wheeling. These losses have prevented flywheels from being considered in applications where cycle times are on the order of days or longer. Electrochemical batteries are typically considered for such applications due to their lower idling losses. Furthermore, batteries have a higher energy density and a lower cost per kWh. If these obstacles could be overcome, flywheel technology would make a superior long-term energy storage source as it has a higher cycle-life, a higher energy-transfer efficiency, and lacks hazardous chemicals.

The sources of idling losses include bearing loss, frictional windage loss due to the high rotational speed, and magnetic losses associated with the motor. Previous work has concluded that bearing loss can be substantially reduced by using carefully designed magnetic bearings and that frictional windage loss can be nearly eliminated by using a vacuum of approximately 1 mTorr. The magnetic losses associated with the motor depend on the type of motor chosen. Induction, variable reluctance, and wound-rotor synchronous motors can reduce or eliminate magnetic losses during times of idling by reducing or removing all excitation. However, these motors are not typically used for high performance flywheel modules: the induction and switched reluctance motors have increased rotor losses which leads to rotor heating problems; the synchronous reluctance motor requires a high Ld/Lq ratio which leads to a rotor structure that is not mechanically robust; and the wound-rotor motors require brushes, which are not practical for high speed operation. The permanent magnet (PM) motor is typically the motor of choice for flywheel systems for the above reasons.

Figure 9B:
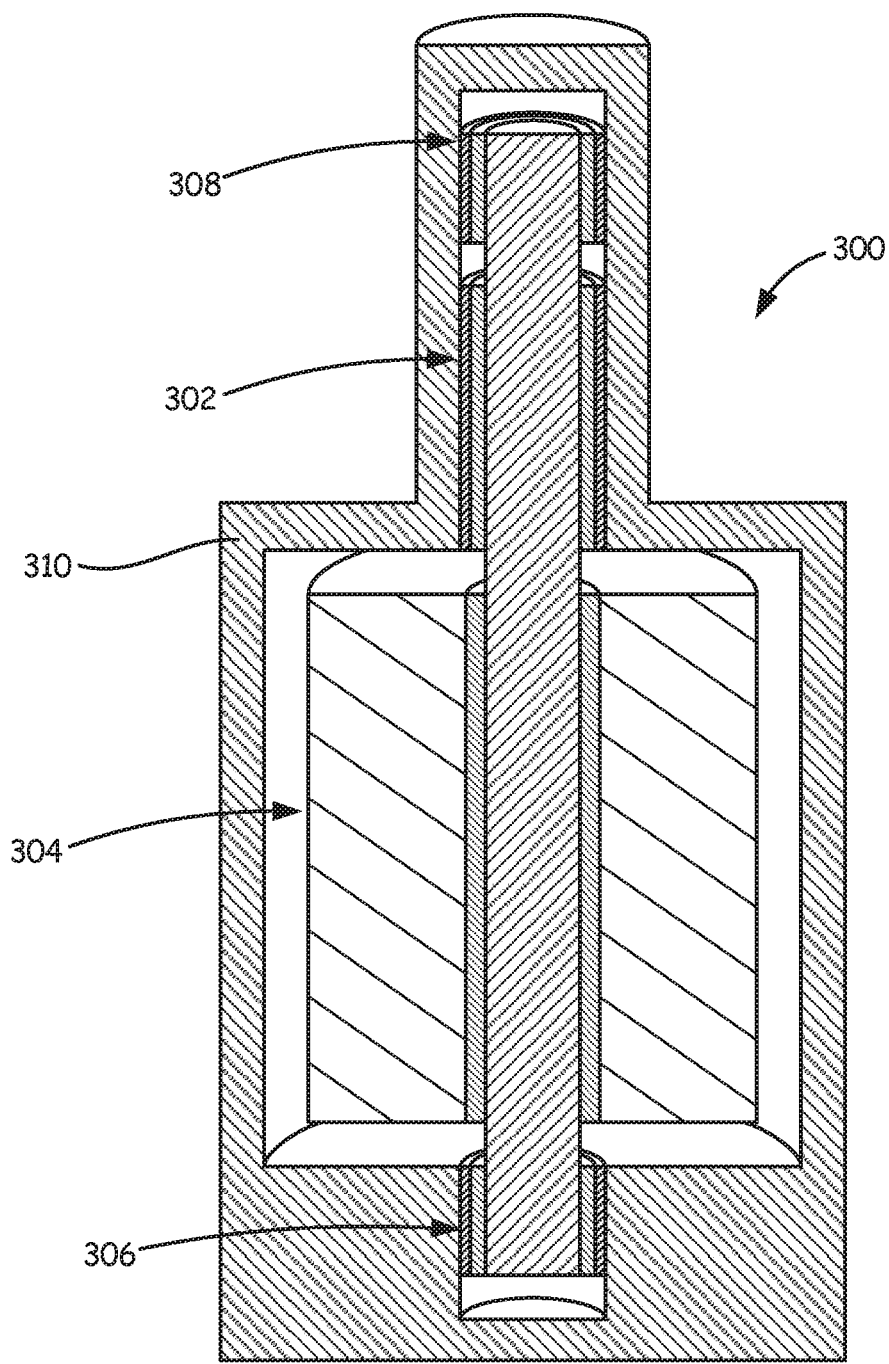
FIG. 9B is a perspective view of a flywheel energy storage system having a permanent magnet.

Varying degrees of flywheel and motor integration have been proposed in the literature. The traditional design topology, which is non-integrated, is depicted in FIG. 9B. A fully integrated design based around an outer-rotor ac homopolar motor, illustrated in FIG. 9C. In this exemplary prior art embodiment, motor/flywheel system 300 comprises a permanent magnet motor 302 coupled to a composite flywheel 304, the combination of which are supported by bearings 306 and 308. An outer containment housing 310 holds a vacuum surrounding the flywheel 304 so as to reduce losses to air resistance is provided.

Figure 9C:
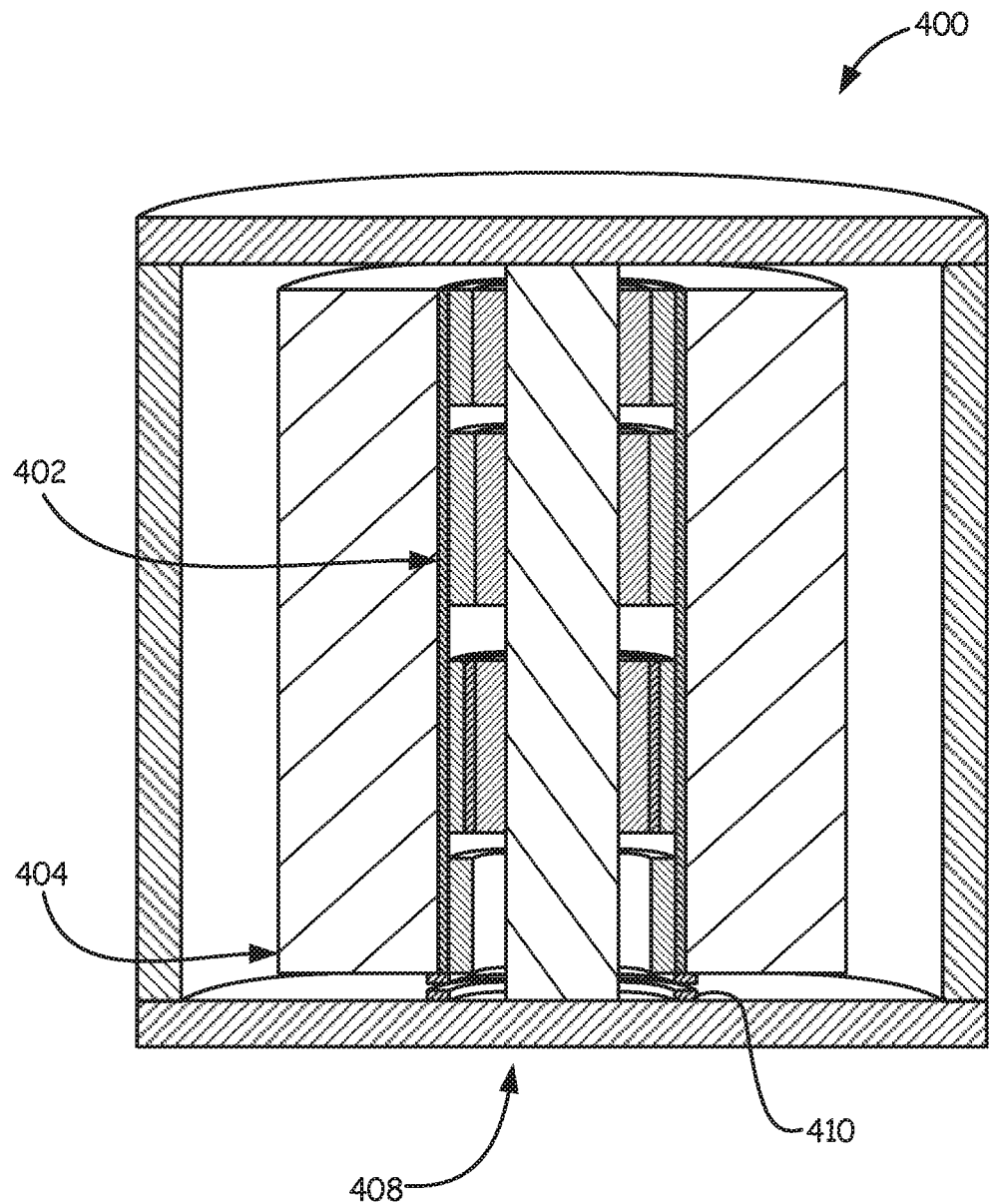
FIG. 9C is a perspective view of a flywheel energy storage system having an ac homopolor with an outer rotor.

An outer-rotor ac homopolar motor/flywheel system 400 is illustrated in FIG. 9C. motor/flywheel system 400 comprises an outer-rotor ac homopolar motor 402 such as that described above coupled to a composite flywheel 404 (see also FIG. 9A). In one embodiment, the suspension windings of the ac homopolar motor 400 which provide radial centering forces can be configured from DPNV windings, while in another embodiment, separate torque and suspension windings can be used. A lower axial bearing 408 provides axial support. In a preferred embodiment, the axial bearing 408 is also magnetic for example formed of a plurality of permanent magnets on a rotor 410 facing a plurality of magnets secured to containment housing 412 (also providing a vacuum enclosure for the motor 402 and flywheel 404).

Since most of the energy of the flywheel 404 is stored near its outer radius, the system 400 design results in a substantially increased energy density. Compared to the PM motor 302, an ac homopolar motor 402 yields lower core losses during energy transfer due to the inherently lower ac magnetic field and the variable excitation allows for the elimination of magnetic losses during times of idling or freewheeling. In addition, by using current based excitation, costly permanent magnets are avoided, reducing the electric motor cost.

Design sizing equations for the ac homopolar motor in a flywheel module are presented and compared to those of a PM motor, and an example design is considered through 3D finite element (FE) analysis in the paper by Severson, E.; Nilssen, R.; Undeland, T.; Mohan, N., "Outer-rotor ac homopolar motors for flywheel energy storage," in *Power Electronics, Machines and Drives* (PEMD 2014), 7th IET International Conference on, vol., no., pp. 1-6, 8-10 Apr. 2014.

APPENDIX

Bearingless Motor Operation

Radial flux bearingless motors produce radial suspension forces by creating an unsymmetrical flux density in the airgap. The forces can be calculated via the Maxwell Stress Tensor, which for the idealized case of radial fields which do not vary with motor's axial length, can be written as $$F_x = \frac{lr}{2\mu_0} \int_0^{2\pi} B_r^2(\alpha)\cos\alpha\, d\alpha$$

$$F_y = \frac{lr}{2\mu_0} \int_0^{2\pi} B_r^2(\alpha)\sin\alpha\, d\alpha$$

where l is the motors active axial length, r is the airgap radius, and $B_r$ is the cumulative radial flux density in the airgap at angular location a. From this expression, it can be shown that to create a radial force, the airgap flux density must contain components which differ in harmonic index by one. Force expressions and suspension operation are now summarized for the two types of radial flux bearingless motors. Note that idealized current waveforms for force and torque production are depicted in FIG. 5.

Operation of Bearingless Motors Where the Suspension Current Produces Magnetic Field in the Airgap of p±1 Pole Pairs These bearingless motors have a radial airgap flux density given by the following expression, assuming that harmonics are neglected.

$$B_F(\alpha) = \hat{B}_F \cos(-p\alpha + \phi_F)$$

Here, p represents the number of pole-pairs of the motor and $\phi_F$ indicates the angular location of the magnetic field at an instant of time. The magnetic field is composed of a magnetizing field and armature reaction field. To transform this type of motor into a bearingless motor, a suspension winding with either p+1 or p−1 pole-pairs is added to the stator to produce a radial flux density which differs in harmonic index by one from the following expression:

$$B_s(\alpha) = \hat{B}_s \cos(-[p\pm 1]\alpha + \phi_s)$$

This flux density is produced by balanced sinusoidal suspension currents, with the currents provided below:

$$i'_u = \hat{I}_s \cos(\phi_s)$$

$$i'_v = \hat{I}_s \cos\left(\phi_s - \frac{2\pi}{3}\right)$$

$$i'_w = \hat{I}_s \cos\left(\phi_s + \frac{2\pi}{3}\right)$$

These currents can be transformed into an equivalent two-phase system using the well-known DQ transformation. If this is done with respect to the angle $\phi_F$, convenient constant expressions for the radial force result as follows, where $i_x$ and $i_y$ are the two-phase DQ currents from the transformation.

$$F_x = k_f i_x$$

$$F_y = k_f i_y$$

Typically, a suspension controller specifies required values of $F_x$ and $F_y$, which are then used to determine the phase currents via an inverse DQ transformation, given below. Noting that $\phi_F$ increases at the speed of the armature winding frequency, it can be seen that to produce a constant force, the suspension currents will have the same frequency as the armature currents.

$$\begin{Bmatrix} i'_u \\ i'_v \\ i'_w \end{Bmatrix} = \frac{\sqrt{2/3}}{k_f} \begin{bmatrix} \cos\phi_F & -\sin\phi_F \\ \cos\left(\phi_F - \frac{2\pi}{3}\right) & -\sin\left(\phi_F - \frac{2\pi}{3}\right) \\ \cos\left(\phi_F + \frac{2\pi}{3}\right) & -\sin\left(\phi_F + \frac{2\pi}{3}\right) \end{bmatrix} \begin{Bmatrix} F_x \\ F_y \end{Bmatrix}$$

Operation of Bearingless Motors where the Suspension Current Produces Magnetic Field in the Airgap of One Pole Pair These motors can be viewed as having a constant radial airgap flux density component which does not vary with the angular position, as follows, and in these motors p is greater than two:

$$B_{F0}(\alpha) = B_{F0}$$

Radial forces are produced by adding a one pole-pair suspension winding to the stator, which produces a flux density given below with the three phase balanced suspension currents as previously defined above.

$$B_s(\alpha) = \hat{B}_s \cos(-\alpha + \phi_s)$$

A DQ transformation, this time with $\phi_F = 0$, can again be used to transform the suspension currents into equivalent x-y currents and obtain the same simple force expressions as above. The same inverse transformation is used to calculate the suspension phase currents, again with $\phi_F = 0$. Since $\phi_F = 0$, it can be seen that to produce a constant force the suspension currents will be DC. Furthermore, no information regarding the airgap flux density's location is needed for suspension force creation, which is viewed as an advantage of this type of bearingless motor.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A motor comprising:
a rotor used in conjunction with a stator to produce a magnetic field in an air gap having p pole pairs, wherein a single cross section of the rotor taken orthogonal to an axis of rotation comprises iron having a structure forming p teeth,
the stator having a dual purpose stator winding comprising suspension windings and torque windings formed from a single set of coils, the stator winding configured to form p pole pairs to produce a first magnetic field from the torque windings to rotate the rotor about the axis of rotation and configured to produce a second magnetic field from the suspension windings of either one pole pair or p±1 pole pairs to create forces radial to the axis of rotation,
the stator winding having two sets of terminals, a set of first terminals for carrying current that produces the first magnetic field in the air gap having p pole pairs to rotate the rotor about the axis of rotation and a set of second terminals for carrying current that produces the second magnetic field in the air gap having either one pole pair or p±1 pole pairs to create the forces radial to the axis of rotation, wherein p is an integer greater than or equal to two, and wherein the set of second terminals experience no motional-electromotive force when the rotor is centered on the axis of rotation.

2. The motor of claim 1 wherein the stator winding comprises at least two phase windings, each phase winding having four groups of coils connected in a bridge configuration, wherein the set of first terminals are disposed at a first pair of opposite corners of each bridge configuration and the set of second terminals are disposed at a second pair of opposite corners of each bridge configuration different than the associated first pair of opposite corners.

3. The motor of claim 2 wherein each second terminal of the set of second terminals of each phase winding are electrically connected to each other.

4. The motor of claim 3 wherein the electrical connection between each second terminal of the set of second terminals comprises a short.

5. The motor of claim 3 and further comprising an inverter to form the electrical connection between each second terminal of the set of second terminals of each phase winding.

6. The motor of claim 5 wherein each inverter is configured to provide at least two voltage levels.

7. The motor of claim 6 wherein each inverter is isolated from each other and from a voltage source connected to the set of first terminals.

8. The motor of claim 1 wherein the stator winding comprises at least two phase windings, each phase winding having two groups of coils connected in series with respect to each second terminal of the set of second terminals and wherein a first terminal of the set of first terminals is located between the two groups of coils of each phase winding.

9. The motor of claim 8 wherein the set of second terminals form a virtual neutral to current carried by each first terminal of the set of first terminals so that current carried by each first terminal of the set of first terminals has two parallel paths.

10. The motor of claim 9 wherein each second terminal of the set of second terminals of each phase winding are electrically connected to each other.

11. The motor of claim 10 and further comprising an inverter to form the electrical connection between each second terminal of the set of second terminals.

12. The motor of claim 1 and further comprising a plurality of switching devices electrically connecting the set of second terminals to one or more power sources, and a control circuit configured to operate the plurality of switching devices as an inverter to provide at least two voltage levels and to control zero sequence current flow.

13. The motor of claim 1 and further comprising a control circuit configured to control current through the of first terminals to operate as a motor and further configured to control current to operate as a generator, wherein when operated as a generator, generated current is provided to the set of second terminals.

14. The motor of claim 13 wherein the control circuit is configured, when operated as a generator, to control current to the set of second terminals as rotational speed of the rotor decreases.

15. The motor of claim 1 and further comprising a second stator winding, wherein the second stator winding is configured to form p pole pairs to produce another first magnetic field to rotate the rotor about the axis of rotation and configured to produce another second magnetic field of either one pole pair or p±1 pole pairs to create forces radial to the axis of rotation, the second stator winding having two sets of terminals, a second set of first terminals for carrying current that produces said another first magnetic field in the air gap having p pole pairs to rotate the rotor about the axis of rotation and a second set of second terminals for carrying current that produces another second magnetic field in the air gap having either one pole pair or p±1 pole pairs to create the forces radial to the axis of rotation, wherein p is an integer greater than or equal to two, and wherein the second set of second terminals experience no motional-electromotive force when the rotor is centered on the axis of rotation.

16. The motor of claim 15 wherein the stator winding is axially spaced apart along the axis of rotation from the second stator winding.

17. The motor of claim 1 wherein the rotor rotates around the stator.

18. The motor of claim 17 and further comprising a flywheel connected circumferentially around the rotor.

19. The motor of claim 10 wherein the electrical connection between each second terminal of the set of second terminals comprises a short.

20. A motor comprising:
a rotor used in conjunction with a stator to produce a magnetic field in an air gap having p pole pairs, wherein a single cross section of the rotor taken orthogonal to an axis of rotation comprises iron having a structure forming p teeth,
the stator having multiple dual purpose stator windings, each stator winding comprising suspension windings and torque windings formed from a single set of coils, each stator winding configured to form p pole pairs to produce a first magnetic field from the associated torque windings to rotate the rotor about the axis of rotation and configured to produce a second magnetic field from the associated suspension winding of either one pole pair or p±1 pole pairs to create forces radial to the axis of rotation,
each stator winding having two sets of terminals comprising a set of first terminals for carrying current that produces the first magnetic field in the air gap having p pole pairs to rotate the rotor about the axis of rotation and a set of second terminals for carrying current that produces the associated second magnetic field in the air gap having either one pole pair or p±1 pole pairs to create the forces radial to the axis of rotation, wherein p is an integer greater than or equal to two, and wherein the set of second terminals experience no motional-electromotive force when the rotor is centered on the axis of rotation.

21. The motor of claim 20 wherein each stator winding comprises at least two phase windings, each phase winding having four groups of coils connected in a bridge configuration, wherein the set of first terminals of each associated stator winding are disposed at a first pair of opposite corners of each bridge configuration and the set of second terminals of each associated stator winding are disposed at a second pair of opposite corners of each bridge configuration different than the associated first pair of opposite corners.

22. The motor of claim 20 wherein for each stator winding, each second terminal of the set of second terminals of each phase winding are electrically connected to each other.

23. The motor of claim 20 wherein each stator winding comprises at least two phase windings, each phase winding having two groups of coils connected in series with respect to each second terminal of the associated set of second terminals and wherein a first terminal of the associated set of first terminals is located between the two groups of coils of each phase winding.

24. The motor of claim 23 wherein for each stator winding the associated set of second terminals form a virtual neutral to current carried by each first terminal of the associated set of first terminals so that current carried by each first terminal of the associated set of first terminals has two parallel paths.

* * * * *

UNITED STATES PATENT AND TRADEMARK OFFICE
CERTIFICATE OF CORRECTION

| | | |
|---|---|---|
| PATENT NO. | : 10,833,557 B2 | Page 1 of 1 |
| APPLICATION NO. | : 15/669594 | |
| DATED | : November 10, 2020 | |
| INVENTOR(S) | : Eric Severson | |

It is certified that error appears in the above-identified patent and that said Letters Patent is hereby corrected as shown below:

In the Specification

In the Statement Regarding Federally-Sponsored Research and Development

Column 1, Lines 22-23:
Delete "Department of Defense/Navy"
And insert --Office of Naval Research--

Signed and Sealed this
Twelfth Day of August, 2025

Coke Morgan Stewart
*Acting Director of the United States Patent and Trademark Office*